(12) United States Patent
Bober

(10) Patent No.: US 6,718,372 B1
(45) Date of Patent: Apr. 6, 2004

(54) METHODS AND APPARATUS FOR PROVIDING ACCESS BY A FIRST COMPUTING SYSTEM TO DATA STORED IN A SHARED STORAGE DEVICE MANAGED BY A SECOND COMPUTING SYSTEM

(75) Inventor: Paul M. Bober, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/479,512

(22) Filed: Jan. 7, 2000

(51) Int. Cl.[7] .................. G06F 15/16; G06F 12/00; G06F 13/00

(52) U.S. Cl. .............. 709/217; 709/219; 709/249; 711/147; 711/151

(58) Field of Search ............... 709/211–219, 248–249, 709/325; 711/147–153

(56) References Cited

U.S. PATENT DOCUMENTS

| | | | | | |
|---|---|---|---|---|---|
| 5,530,845 | A | * | 6/1996 | Hiatt et al. .................... | 703/27 |
| 5,758,125 | A | * | 5/1998 | Misinai et al. ................. | 703/23 |
| 5,852,724 | A | * | 12/1998 | Glenn et al. ................. | 709/239 |
| 5,913,227 | A | | 6/1999 | Raz et al. .................... | 711/152 |
| 5,950,203 | A | | 9/1999 | Stakuis et al. ................. | 707/10 |
| 5,987,506 | A | * | 11/1999 | Carter et al. ................. | 709/213 |
| 6,006,018 | A | * | 12/1999 | Burnett et al. ............... | 709/219 |
| 6,044,205 | A | * | 3/2000 | Reed et al. .................. | 709/201 |
| 6,061,504 | A | * | 5/2000 | Tzelnic et al. ............... | 709/219 |
| 6,078,929 | A | * | 6/2000 | Rao .......................... | 707/200 |
| 6,085,234 | A | * | 7/2000 | Pitts et al. ................... | 709/217 |
| 6,163,796 | A | * | 12/2000 | Yokomizo ................... | 709/203 |
| 6,175,832 | B1 | * | 1/2001 | Luzzi et al. .................. | 707/10 |

(List continued on next page.)

OTHER PUBLICATIONS

"Mainframe File System on Windows NT and AIX—Towards Heterogeneous Cluster File Share?" by Motohiro Kanda, Systems Development Lab, Hitatchi Ltd, Yokohama, Japan. Published in Proceedings of Computer Measurement Group 1999 International Conference, Reno Nevada, Dec., 1999. See http://www.cmg.org/conference/prelim99/99navigation99.html.

"SymmAPI–Access for MVS, UNIX and Windows NT Release Version 1.1.8 Programmers Reference Guide," Published by EMC Corporation, Hopkinton, MA. First Published, Sep. 28, 1998.

*Primary Examiner*—Rupal Dharia
*Assistant Examiner*—Melvin H. Pollack
(74) *Attorney, Agent, or Firm*—Chapin & Huang, LLC; Barry W. Chapin, Esq.

(57) ABSTRACT

The system of the invention is a data server that can provide access to data, such as mainframe data, by open systems platforms. The system includes a shared storage interface coupling a first computing system to a shared storage device in which the shared data is maintained by a second computing system in a manner that is not natively compatible to the first computing system. The computing system further includes a data access server which executes on the processor in the first computing system. When executing, the data access server receives, via the network interface, a client message to access data on the shared storage device and in response to receiving the client message, retrieves, via the network interface, data storage information provided from the second computing system coupled to the first computing system. The data storage information is stored in the memory system and allows the data access server on the first computing system to access the data in the shared storage device in a manner that is compatible with the first computing system. The data access server can also provide a virtual file system to allow networked clients that implement file or other data sharing protocols such as NFS and CIFS.

25 Claims, 9 Drawing Sheets

U.S. PATENT DOCUMENTS

| | | | |
|---|---|---|---|
| 6,185,218 B1 * | 2/2001 | Ratcliff et al. | 370/405 |
| 6,192,408 B1 * | 2/2001 | Vahalia et al. | 709/229 |
| 6,212,640 B1 * | 4/2001 | Abdelnur et al. | 713/201 |
| 6,253,258 B1 * | 6/2001 | Cohen | 709/331 |
| 6,269,394 B1 * | 7/2001 | Kenner et al. | 709/217 |
| 6,292,827 B1 * | 9/2001 | Raz | 709/217 |
| 6,304,942 B1 * | 10/2001 | DeKoning | 711/114 |
| 6,327,614 B1 * | 12/2001 | Asano et al. | 709/213 |
| 6,334,154 B1 * | 12/2001 | Gioquindo et al. | 709/236 |
| 6,356,863 B1 * | 3/2002 | Sayle | 703/27 |
| 6,385,615 B1 * | 5/2002 | Haeri et al. | 707/10 |
| 6,415,288 B1 * | 7/2002 | Gebauer | 707/10 |
| 6,427,151 B1 * | 7/2002 | Chan et al. | 707/101 |
| 6,453,354 B1 * | 9/2002 | Jiang et al. | 709/229 |
| 6,496,865 B1 * | 12/2002 | Sumsion et al. | 709/229 |

* cited by examiner

245

| 250-1 NFS | 250-2 CIFS | 250-3 JAVA BEANS | 250-4 CORBA | 250-5 COM | 250-N OTHER |
|---|---|---|---|---|---|
| 260 DATA ACCESS TRANSLATOR ||||||
| 270 DATA ACCESS ROUTINES ||| 276 VIRTUAL FILE SYSTEM || 275 OPERATING SYSTEM HOOKS |

| 262-1 COMMAND: NFS READ | 262-2 FROM CLIENT: DATA ACCESS CLIENT 208-1 | 262-3 TO SERVER: DATA ACCESS SERVER 210 | 262-4 FILE NAME: DATA 220 | 262-5 NUMBER OF BYTES 50 | 262-M OTHER |
|---|---|---|---|---|---|

FIG. 7B

METHODS AND APPARATUS FOR PROVIDING ACCESS BY A FIRST COMPUTING SYSTEM TO DATA STORED IN A SHARED STORAGE DEVICE MANAGED BY A SECOND COMPUTING SYSTEM

RELATED APPLICATIONS INCORPORATED BY REFERENCE

The present invention relates to the following references:

i) Co-pending U.S. patent application Ser. No. 08/939,069, entitled "System for Enabling Access to One Computer System's File System from Another Type of Computer", filed Sep. 29, 1997; and ii) Issued U.S. Pat. No. 5,913,227, entitled "Agent-Implemented Locking Mechanism," filed Mar. 24, 1997.

Each of these references is assigned to the assignee of the present invention. The teaching and content of these references is hereby incorporated by reference in its entirety.

FIELD OF THE INVENTION

The present invention generally relates to data storage and data access systems, and more particularly, to systems and techniques which provide access to shared data for applications that perform on computer systems.

BACKGROUND OF THE INVENTION

The ability of modem computer and data processing systems to share data has largely contributed to the popularity and rapid expansion of computer networking industries such as the Internet. In response to this insatiable demand, computer system and software developers have created various prior art data sharing mechanisms to allow one or more computer systems to obtain access to data created, stored, or maintained by another computer system. Generally, computer systems that share data do so over a network using a standardized client/server protocol for data exchange. Many such client/server protocols exist, examples of which include database access protocols, file sharing protocols, and world wide web (WWW) based protocols. Other data sharing systems have been developed to allow two computer systems to share data from a commonly shared storage device having a direct connection to each computer.

FIG. 1 illustrates an example of a commonly used prior art client/server data sharing mechanism called the "Network File System (NFS)." Sun Microsystems, Inc. of Mountain View, California developed NFS and owns NFS as a trademark. Many commercial operating systems incorporate NFS and its widespread use has allowed NFS to become an industry standard for sharing data between networked computer systems. In the illustrated example, a mainframe computer 102 operates using the MVS operating system 105 to allow software applications (e.g., a database program, not specifically shown) that execute on the mainframe 102 to create and store data in records and MVS data sets (not shown) within the storage device 110 according to an MVS specific format. An NFS Server 109, provided as part of the MVS operating system 105, "understands" how to properly access the MVS data stored in the MVS data sets within the storage device 110. In other words, the NFS server 109 is customized for MVS and can read MVS data sets. The NFS Server 109 can "export" MVS data maintained within the storage device 110 onto the network 113 (e.g., a TCP/IP network) for access by other remote computer systems such as the Unix workstation 101. The NFS server 109 only allows file local systems to be exported in this manner. In other words, the same computing system (i.e., mainframe 102 in this example) that maintains and manages file systems and data in the storage device 110 must execute the NFS server 109 which can export those file systems.

A systems manager (a person, not shown) responsible for managing workstation 101 can configure the NFS client 108, provided as part of the Unix operating system 104 to "mount" the MVS file system that is "exported" by the NFS server 109. Once the NFS client 108 has "mounted" the "exported" file system over the network 113, the application 106 that executes on workstation 101 can have access to (e.g., can read and write) data on the storage device 110 via the NFS client 108. Generally, the NFS client 108 provides such data access to the application 106 over the network 113 in real time, just as if the storage device 110 containing the data were coupled locally (e.g., via a direct disk drive connection such as a SCSI cable) to the workstation 101. By way of example, when the application 106 makes operating system calls to access data on the storage device 110 (e.g., uses a function such as fopen( ) to open data), the operating system passes such calls to the NFS client 108 which relays the calls to the NFS server 109 using a standard set of NFS protocol messages. The NFS server 109 receives the NFS protocol messages, and, using its knowledge of the MVS data and storage formats, carries out the requested commands (e.g., read and/or write) on data within MVS data sets maintained in the storage device 110.

Developers of NFS (e.g., 109) often customized an NFS server to the operating system in which it resides (MVS in this example). This allows the NFS server to "serve" data created or maintained by that operating system to one or more NFS clients (e.g., 108) over the network 113. Likewise, developers custom design NFS clients (e.g., 108) for the operating system (e.g. 104) in which they will execute to allow applications (e.g., 106) that execute on that operating system to access data over the network 113 without regard for the type of host platform (e.g., MVS mainframe 102) that is serving the data.

The most commercially available version of NFS (NFS Version 3) has been widely adopted for remote data access and incorporates about fifteen standardized NFS protocol messages or commands, which collectively comprise the NFS protocol. The NFS clients and NFS server can exchange these messages. Examples of NFS messages exchanged between the NFS client and NFS server are READ, WRITE, MKDIR, RMDIR, RENAME, LINK, MKNOD, and so forth. Those skilled in the art will recognize that these NFS message closely parallel file system commands used to manipulate directories (e.g., mkdir( ), rmdir( )), files (e.g., read( ), write( )), and data structures (e.g., link( )) associated with file systems.

NFS protocol messages and commands generally allow an NFS client operating on most types of host computer platforms or operating systems (e.g., Unix, Windows, and so forth) to access an NFS server that serves data from most any other type of host platform or operating system. Incompatibilities of operating system calls and data and/or file storage formats between the client (e.g. Unix workstation 101) and server (e.g., Mainframe 102) are largely hidden from the application 106. For example, if application 106 uses a Unix command to list files (e.g., an "ls" command) contained within a file system provided by the NFS client 108 (i.e., served from NFS server 109), the NFS client 108 may send a standard NFS protocol massage called "READ- DIR" to the NFS server 109. The NFS server 109 receives the READIR NFS protocol message and can use a corresponding MVS command to obtain, for instance, MVS catalog information containing the names of data sets stored on the storage device 110. The NFS server (e.g., 109) can also use the NFS protocol to return data from the storage device 110 (e.g., data from an MVS data set) over the network 113 back to the NFS client (e.g., 108) to satisfy the access requests.

FIG. 2 illustrates another prior art technique for obtaining access to data stored on a remote computer system. The technique illustrated in FIG. 2 uses a standardized protocol called the file transfer protocol (FTP) to provide a connection 113 between an FTP server 121 and an FTP client 120 to transfer an entire file, for example, from the mainframe 102 to the workstation 101. Generally, whereas NFS (FIG. 1) requires a systems manager to mount and export an NFS file system to the workstation 101, in FIG. 2, a user application 106 can invoke the FTP client 120 directly using an FTP command to cause the FTP client 120 to request the entire contents of one or more files from the FTP server 121. In response to such an FTP command, the FTP client 120 provides standard FTP protocol messages over network 113 to the FTP server 121. In response to such messages, the FTP server 121 finds and then transfers the entire contents of the requested file(s) obtained from the storage device 110 back to the FTP client 120 on the workstation 101 via the network 113. The FTP client 121 receives the data during the transfer and stores the data into a file created within the local storage device 125 (e.g., local hard disk) on the workstation 101. Once the transfer is complete, the FTP session (i.e., the FTP protocol communications between the FTP client and FTP server) is over and the application 106 can access the copy of the requested file as needed directly on the local storage device 125.

As with NFS (FIG. 1), FTP clients and FTP servers communicate using a standard set of messages that collectively define the FTP protocol. Also as with NFS, the protocol communications and the actual data transfer typically occur over the same network connection 113. Since both protocols are standardized, computers that use different operating systems and file systems (e.g., Unix and MVS) can still exchange data. FTP is generally more limited in its capabilities than NFS since FTP merely provides a complete local copy of an entire data file. FTP is also not considered a true real-time data access protocol in that the data access by an application (e.g., 106) takes place generally after the entire file has been transferred to the destination local storage device (e.g., 125). Since FTP provides only a copy of the data file for use by the application 106, changes to the original file that occur after the FTP file transfer is complete may not be reflected in the copied version of the file stored within the local storage device 125. Most versions of the NFS protocol however operate in real-time to access data immediately when the server receives a data access request.

FIG. 3 illustrates another prior art data sharing technique which is described in more detail in U.S. Pat. No. 5,950,203, entitled "Method and Apparatus for High-Speed Access to and Sharing of Storage Devices on a Networked Digital Data Processing System" (Stakuis et al.). This reference discloses a system that purports to provide the ability for two computer systems (nodes 16 and 18) to each directly access a storage device 36 that is directly coupled via paths 44 and 46 to each node 16, 18. As explained, a "fused drive" approach is taken in which node 18 acts as a server to store physical file mappings and other administrative information concerning data in the storage device 36. Generally, node 18 uses a network server process 56 to act as a file server serving data via a network connection 26 to the node 16. However, for some data access operations such as bulk reads and writes, the system allows node 16 to use the direct connection 46 to the shared storage 36 to perform data access. This system provides this capability since each of the nodes 16 and 18 are assumed to have the same file system storage formats. That is, each node 16 and 18 is able to natively access the data via a file system format imposed on the shared storage device 36 that is common to both nodes 16 and 18.

Generally, the system performs data access commands locally on node 16, without going over the network 26 to the server (e.g., the bulk reads and writes), by intercepting such calls in the filter driver 66 in node 16 and issuing them locally via direct connection 46 to the share storage 36. In other words, the illustrated example routes some data access requests through the regular networking technology 26, while others that can be handled locally are by-passed and go directly to the attached storage interface 46. In order to implement the system disclosed, all participating nodes must be directly coupled (e.g., node 16 coupled via interface 46) to the shared storage 36. All participating nodes (i.e., 16, 18) must also be in communication with each other via networking (e.g., network 26) and regular network protocols must be present that allow for mounting remote file systems. In other words, a distributed file system protocol such as NFS or CIFS (functionally similar to NFS but used for computers using the Microsoft Windows family of operating systems) must be present on both nodes 16 and 18.

The general operation of the system in FIG. 3 is as follows: A configuration program on node 16 provides a "make fused" command which essentially allows a client in the upper file system 50 on node 16 (e.g., a client of network server 56) to issue a "mount" command to mount a remote file system from node 36 that is "served" by the network server 56 in node 18 over the network 26. During the processing of the "make fused" command, the filter driver 66 in node 16 detects that a direct connection 46 exists to the storage device 36 containing the file system to be remotely mounted and can locally (e.g., within node 16) create a mapped device for this file system. This essentially allows the filter driver 66 to directly mount the file system via interface 46 for certain data access commands.

The filter driver 66 can detect and intercept all attempted accesses to files within the locally "mounted" file system in shared storage 36. Upon such an initial attempted access to any file (e.g., an application 48 making a call to the upper file system 50 to the createfile( ) operating system function to create a file for reading or writing), the client filter driver 66 in node 16 intercepts the call to the createfile( ) function. The filer driver 66 then uses the distributed file system protocol (e.g., NFS) to issue a write( ) request over the network 26 to the network server 56 on node 18. The network server 56 is customized to obtain the write( ) request and to create the ghost file in the storage device 36 in response. The ghost file created by network server 56 in response to the write( ) command includes a file name and a file layout. Once the file layout exists for the ghost file on node 18 (created in response to the write( ) command), the filter driver 66 on node 16 then issues a read( ) distributed file system command (e.g., using NFS) over network 26 to the network server 56 on node 18 to "pretend" to read the ghost file just created. The read( ) command causes the network server 56 on node 18 to return the file layout for the ghost file to the filter driver 66 in node 16. The filer driver 66 stores the file layout in a map which indicates how the ghost file, which was not actually created in device 36, would have been laid out in the shared storage device 36.

When the filter driver 66 on node 16 has cached the map containing the file layout information, subsequent read( ) and write( ) requests to the file by applications 48 can be intercepted by the filter driver 66. In response to such access requests, the filter driver 66 interrogates the map for file layout information and using this information, blocks of data for the file can be read via the direct connection path 46 to the shared storage. In the case of writes, the process is similar but direct access writes via interface 46 are restricted to storage areas within the space defined in the file layout map. If the applications 48 attempt to write additional information to the file that exceeds the size of the file as determined in the file layout map (e.g., exceeds the disk storage space currently allocated for the file by the server 150), the distributed file system protocol (e.g., NFS) is used to perform the additional writes over the network 26 between the upper file system client 50 on node 16 and the network server 56 on node 18.

FIG. 4 illustrates yet another technique for sharing data between computer systems. The technique shown in this figure is provided by a software product called "SymmAPI-Access" (formerly called "InstaShare"), which is produced by, and is a trademark of, EMC Corporation of Hopkinton, Mass., the assignee of the present invention. As illustrated, SymmAPI-Access provides a suite of SymmAPI-Access routines 130 which may be contained, for example, in a C function library on the workstation 101. During a design and development phase of the application 106, a programmer can incorporate calls to the SymmAPI-Access routines 130 within the code of the application 106. When the application 106 is subsequently executed on the workstation 101, the SymmAPI-Access routines 130 on the workstation 101 can interact over the network 135 with a SymmAPI-Access agent 131 on the mainframe 102. A combination of the routines 130 allows, for example, the application 106 to open and read MVS data sets (not shown) stored within the shared storage device 111.

More specifically, an application 106 can make a sequence of calls to the routines 130 which send SymmAPI-Access messages (not shown) to the SymmAPI-Access agent 131 on the mainframe 102. The SymmAPI-Access messages are used to request mainframe catalog information called metadata which contains data format, disk extent, and data location information for data stored in data sets maintained by the mainframe 102 in the shared storage 111. In response to requests for metadata, the SymmAPI-Access agent 131 returns the metadata to the routines 130 in the application 106 over the network 135. The SymmAPI-Access agent 131 also handles other issues related to mainframe data access such as security, user authorization, file locking and so forth. Once the application 106 receives the metadata, the application 106 can invoke calls to other SymmAPI-Access routines 130 which use the metadata obtained from the network 135 to directly access data in the data sets over a direct connection 138 to the shared storage 111. The direct connection 138 may be a high speed SCSI or fiber optic connection, for example.

In this manner, the SymmAPI-Access product allows an application 106 on the workstation 101 to obtain direct access to data maintained by the mainframe 102 in the shared storage 111 without having to transfer the actual data through the mainframe 102 and onto the network 135. As such, network bandwidth and mainframe processor cycles are conserved. An example of a shared storage device 111 that allows multiple data connections (e.g., connection 138 to the workstation 101 and connection 137 to mainframe 102) is the Symmetrix line of data storage systems produced by EMC Corporation.

SUMMARY OF THE INVENTION

The present invention significantly overcomes many deficiencies and problems that can arise in prior art data sharing mechanisms. For example, one such deficiency is that the prior art data sharing arrangements in FIGS. 1, 2 and 3 rely heavily on the use of a processor within the computer system (e.g., mainframe 102 or node 18) that is responsible for maintaining the data to also serve the data. With respect to the arrangements in FIGS. 1 and 2 (the NFS and FTP examples), the NFS server 109 (FIG. 1) or the FTP server 121 (FIG. 2) are responsible for transferring all data from the mainframe 102 back to either the NFS or FTP clients 108, 120. In FIG. 3, while the "fused drive" system can handle some data access transactions locally on node 16, the system requires that others use the network server 50 to serve the data over the network 26 back to the client 66. In each of these cases, large data transfers can place a heavy burden on the processor in the server computer, and can significantly reduce the amount of bandwidth available on the network (113 in FIGS. 1 and 2, 26 in FIG. 3). Moreover, in the case of the FTP protocol (FIG. 2), the system consumes local storage space 125 with a copy of the data file, which also gives rise to consistency concerns in the data as a result of the existence of two copies of the same data.

While the data sharing arrangement in FIG. 3 does alleviate some of the network and server processing burdens by allowing some data access to be provided over the direct connection 46 to the shared storage device 36, all nodes (16 in this example) that require access to the shared data using the technique each require a direct connection to the shared storage device 35. Such nodes also require a distributed network server 50 to operate on the same node that is responsible for maintaining the data in the device 36 (node 18 in this example), giving rise to processor burden concerns noted above. Also, since the network server 50 resides on the node 18 that is primarily responsible for maintaining the data in the storage device 36, clients in other nodes (e.g., filter driver 66 in node 16) require their respective nodes to have a direct connection to the shared storage 36 in order to intercept and re-direct data access calls over the directly connected interface 46. Without such a direct connection, the system would not function.

Other disadvantages of the system described above with respect to FIG. 3 are that applications 48 that require access to the shared data must perform (i.e., execute) on the node 16 that has the direct connection 46 to the shared storage device 36. If another node executes applications which require access to the data, those other nodes must contain a direct connection of their own to the shared storage device 36.

Further still, since the filter driver 66 relies heavily on its intimate knowledge of data storage formats (e.g., maps) used to store data within the storage device 36 and provides the same data storage format to the upper and lower file systems 50, 52 in node 16, it seems apparent that such a system would incur significant problems if the data storage format used to store data in the shared storage device 36 managed by node 18 were significantly different than a storage format natively used or required by node 16. As an example, in FIG. 3, if node 18 were an MVS mainframe storing data in a flat file system of MVS data sets on the storage device 36, and node 16 were an open systems platform that used a typical Unix hierarchical file system to store data, the filter driver 66 would certainly experience difficulty when attempting to correlate the MVS flat file system storage format with the more hierarchical storage format commonly found in Unix file systems. As such, while the reference U.S. Pat. No. 5,950,203 describing this system notes that the operating systems may be different, it seems implied that each node must use the same file system format to store data. This system may be problematic in real world situations where, for instance, a Unix workstation may actually require access to mainframe or even PC data in which case the two data formats may not precisely match.

A disadvantage of the data sharing arrangement in FIG. 4 is that each application 106 must incorporate system calls to the SymmAPI-Access routines directly into the source code of the application 106. This can limit the applicability of this system to custom uses. In other words, applications developed from scratch can benefit from such a system, but third party applications must be ported to use calls to the SymmAPI-Access routines 130 (FIG. 4). Porting software to the SymmAPI-Access platform may be a labor and time intensive process requiring intimate knowledge of the application code. Moreover, many software developers are reluctant to release their source code for porting purposes.

Finally, many of the prior art data sharing arrangements are implemented primarily in conjunction the operating system of each computing platform. For example, on the client side, the NFS client 108 (FIG. 1) and the filter driver client 66 (FIG. 3) are bound tightly to the operating system which generally invokes such components when calls to the operating system are made.

The FTP system (FIG. 2) and the Symm-API Access system (FIG. 4) each somewhat remove the tight bond with the operating system and let applications 106 that operate in the user space of the workstation 106 access the data. However, each of these systems suffers from the issues noted above related to requiring the calls to be integrated into the source code of the application 106. In other words, for applications to use such systems, developers must modify application code accordingly.

Conversely, the present invention significantly overcomes many of the problems associated with prior art systems. The present invention provides a configuration for data sharing comprising configurations and techniques that provide a user space distributed file system server for accessing shared data via standard clients that operate using standard protocols. Generally, the invention operates in a networked environment where a first computing system and a second computing system, which may be a mainframe, for example, each have a dedicated connection to a shared storage device. The first and second computing systems also have a network connection between each other. The first computing system operates a data access server and can serve mainframe data, which the first computing system does not primarily maintain, to local applications on the first computing system or to applications on other computing systems that do not necessarily have a direct connection to the shared storage device containing the data to be served.

In all instances, the system of the invention uses a client/server paradigm with data access clients using standard protocols as the preferred mechanism to access the data access server. Since the server of the data is not the same computing system as the system that primarily maintains the data, processor and network bandwidth with respect to the computer system that maintains the data are significantly conserved. This allows, for instance, mainframe data to be served by, for example, an open systems computing system while allowing the mainframe to focus on other tasks besides serving the data. In situations where many clients desire access to the data, the distributed design of the invention prevents the clients from burdening a single machine to gain data access. This allows the system of the invention to quite scalable.

Using this networking configuration, the system of the invention includes a method for providing access by a first computing system to data stored in a shared storage device managed by a second computing system. The access can be provided even in situations where the data storage format provided in the shared storage by the second computing system is incompatible with a data storage format required by the first computing system, though the two formats may also be compatible.

One such method provided by the invention receives, at a data access server performed on a first computing system, a client message to access data on the shared storage device. In response to receiving the client message, the data access server retrieves data storage information provided from the second computing system coupled to the first computing system. The data storage information allows the first computing system to access the data in the shared storage device in a manner that is compatible with the first computing system. The data access server then provides access to the data on the shared storage device, directly from the data access server, based on the retrieved data storage information.

In another embodiment, the data access server is a distributed data server and the operation of receiving the client message includes providing, from the data access server to at least one data access client requiring access to data in the shared storage device, a distributed data interface that operates according to a distributed data protocol. NFS, for example, may serve as such a distributed data protocol. This allows the data access server to communicate in an off-the-shelf manner with data access clients via client messages formatted according to the protocol. In operation, the data access server accepts the client message from the data access client using the distributed data protocol over the distributed data interface provided by the data access server. The client message includes a data access command formatted in accordance with the distributed data protocol. The data access command indicates a type access to be provided to the data in the shared storage device on behalf of the client.

In another configuration, the data access server is a distributed file system data access server and the distributed data interface is a distributed file system interface provided by the data access server and the distributed data protocol is a distributed file system protocol such as NFS or CIFS. The operation of accepting the client message includes receiving the client message from the at least one data access client in accordance with the distributed file system protocol. The distributed file system protocol may be, for example, at least one of a network file system (NFS) protocol, a web based network file system protocol (e.g., WebNFS) and/or a CIFS protocol. The distributed data protocol in the case of non-file system protocols may be a CORBA data exchange protocol, a Java Beans based messaging protocol, or a hypertext transfer protocol, for instance. Other protocols which are too numerous to mention here can also be supported between the client and data access server. Such protocols allow, for instance, the data access server to serve MVS data to clients in a standard manner, without modification to the clients or the client applications.

In another arrangement, a data access client requiring access to data in the shared storage device is performed on a computing system that is different than the first computing system and the operations of providing and accepting are performed by the data access server using the distributed data access protocol over a network coupling the first computing system with the computing system performing the at least one data access client. This allows applications that execute or otherwise perform on hosts that do not have a direct connection to the shared storage to nonetheless obtain access to the data via the data access server. Prior art data sharing mechanisms generally all require the host that executes the application to also have a dedicated (i.e., not a general network) connection to the shared storage device.

In another arrangement, the operation of retrieving data storage information retrieves the data storage information from a virtual file system maintained in the first computing system by the data access server. The virtual file system generally can obtain the data storage information from the second computing system prior to receipt of a client message in response to processing formerly received client messages. That is, the virtual file system can maintain data storage information about data that has, for instance, already been accessed by client request messages. Future requests can be handled by the data storage information cached in the virtual file system, without the need to go back to the second computing system via a data access routine.

In another arrangement of the invention including the virtual file system, the operation of retrieving the data storage information from the virtual file system includes searching a number of unodes in the virtual file system to obtain a unode corresponding to the data to which access is requested in the client request message and obtaining the data storage information from the virtual file system based on the unode. Unodes, which make up the virtual file system in such an embodiment, are assigned individual portions of data and a unode stores the data storage information for that respective portion.

In another arrangement, the operation of retrieving the data storage information first determines if suitable data storage information is available locally on the first computing system to allow the data access server to provide access to the data on the shared storage device in accordance with the client message in a manner that is compatible with the first computing system. Such data storage information may be available locally, for instance, in a virtual file system. If the required data storage information is available locally, the system of the invention uses the suitable data storage information that is available locally on the first computing system as the retrieved data storage information. If not, the system retrieves, from the second computing system, the data storage information that is required for accessing the data in the shared storage device in a manner that is compatible with the first computing system.

In another arrangement, the operation of providing access to the data on the shared storage device based on the retrieved data storage information includes performing, by the data access server, at least one data access routine to access the data in the shared storage device in a manner specified in the client message. The data access routine uses the data storage information to properly locate and access the data in a format that is compatible with the first computing system.

In another arrangement used to read data, the client message requests read access to the data in the shared storage on behalf of an application and the operation of performing the data access routine(s) to access the data in the shared storage device includes the operation of reading the data in a manner specified in the client message from the shared storage device at a location specified by the retrieved data storage information and returning the data read by the operation of reading from the data access server to a data access client that originated the client message. Such an arrangement allows, for example, clients to use NFS or CIFS to read MVS data sets from a mainframe that are served via the data access server. The clients may be local to the host performing the server, or may be across a network on other remote hosts.

In other arrangements, the first computing system is an open systems computing system and the second computing system is a mainframe computing system and the operation of receiving a client message includes allowing data access client(s) to access the data access server using a distributed file system protocol to request access via the data access server to mainframe data maintained by the mainframe computing system in the shared storage device. The operation of providing access to the data on the shared storage device from the data access server includes using the data storage information retrieved from the mainframe computing system to directly and compatibly access, by the data access server, the data stored on the shared storage device as specified by a command in the client message and then serving the data to the data access client(s) from the data access server using one or more distributed file system protocols.

In a variation of the above arrangements, the data access client(s) is performed on the first computing system and acts on behalf of an application also performed on the first computing system and the operations of retrieving the client message and providing access to the data are performed between the data access client and the data access server using the distributed file system protocol within the first computing system.

In another variation, there are a plurality of data access clients and the operation of serving the data includes the process of serving data maintained by the mainframe in the shared storage device from the data access server on the first computing system to the plurality of data access clients using a distributed file system protocol.

In yet another variation, at least one of the data access clients is performed on a computing system that is different that the first and second computing systems and the operations of retrieving the client message and providing access to the data are performed over a network coupling the first computing system and the computing system that is performing the data access client.

The general methods of the invention also include operations of maintaining, on the first computing system, a virtual file system containing a plurality of nodes, with at least one node for each portion of data for which access is requested via client messages. In these embodiments, the operation of retrieving the data storage information includes determining if the data for which access is requested via the client message has a corresponding node in the virtual file system, and if so, (i) retrieving the data storage information from the corresponding node in the virtual file system, and if not, (i) retrieving the data storage information from the second computing system, (ii) creating at least one node in the virtual file system based on the retrieved data storage information; and (iii) putting at least a portion of the data storage information retrieved from the second computing system into the node created for that data in the virtual file system.

In variations of the above embodiments, the operation of maintaining includes maintaining each of the plurality of nodes in the virtual file system on the first computing device in a hierarchical format, with different levels of the hierarchical format representing different elements of a storage system managed by the second computing system. The hierarchical format, in other embodiments, maps a mainframe storage arrangement of the data stored in the shared storage device to an open systems file system arrangement.

According to other variations, the operation of maintaining maintains, for each node in the virtual file system, information concerning the relation of that node to other nodes in the virtual file system and a unique handle for the node. The operation of maintaining can also maintain, for each node in the virtual file system, data access information including at least one access position for the data within the shared storage device.

In other arrangements, the operation of retrieving data storage information includes determining if appropriate data storage information is available in a virtual file system maintained by the data access server on the first computing system based on client request parameters in the client message. If not, the operation of the system of the invention includes selecting one or more first data access routines based on a protocol command specified by the client message. Then, the operation includes performing the first data access routine(s) to allow the data access server on first computing system to communicate with the second computing system to request the data storage information from the second computer system. The operation continues by receiving a response to the data access routine(s) from the second computer system and parsing the response to the data access routine(s) to determine the data storage information and placing the data storage information into the virtual file system maintained by the data access server on the first computing system. The data storage information may be placed, for example, into a unode data structure. However, if appropriate data storage information is available in a virtual file system maintained by the data access server on the first computing system (e.g., if a unode already exists and contains the required data storage information) based on client request parameters in the client message, the operation translates client request parameters contained in the client message into data access parameters useable for the selected data access routine(s). The operation of translating uses data storage information contained in a virtual file system (e.g., an appropriate unode or other data structure) to provide a location in the shared storage device of data for which access is specified in the client request message (i.e., data that matches the unode).

In another arrangement, the operation of translating client request parameters contained in the client message includes obtaining at least one client request parameter from the client message and mapping the client request parameter(s) to at least one data access routine parameter required for performance of the data access routine(s). The data access routine parameter(s) specify data storage information to allow the data access routine to obtain access to a location of data within the shared storage device.

According to yet another arrangement, the operation of mapping includes using data access translator functions to query a virtual file system of unodes for a specific unode corresponding to a data access handle provided in the client message and obtaining from the unode the data storage information.

In another arrangement, the operation of performing the data access routine(s) includes communicating between the data access server on the first computing system and a data access agent on the second computing system to obtain the data storage information required to perform a protocol command specified by the client message. In a related arrangement, the first computing device is an open system computing system and the second computing device is a mainframe and the data storage information is contained within metadata maintained within the mainframe. In such an arrangement, the operation of communicating sends a data access request to the data access agent to return metadata obtained from a mainframe catalog for the shared storage device. The metadata includes data storage information for the data maintained by the mainframe in the shared storage device. An example of metadata would be MVS data set catalog data.

According to the general arrangement, the operation of providing access to the data on the shared storage device includes mapping the data storage information into at least one data access routine parameter of at least one data access routine. Such a data access routines may be tailored, for example, to access the shared storage device, rather than the second computing system (e.g., the mainframe). Then, using this data access routine, the system directly accesses the shared storage device by performing the data access routine (s) to send data access requests to the shared storage device. This operation also includes retrieving, in response to the data access requests, a storage device response including data for which access is requested in the client message and providing the data to a data access client that originated the client message.

Another technique provided by the system of the invention is a method for providing access to data in a shared storage device from a data access server performing on a first computing system. The data is maintained by a second computing system, such as a mainframe. By maintained, what is generally meant is that the data set is initially created by the mainframe in a mainframe data storage format, or that the data in a data set or other storage file or format is routinely manipulated by the mainframe and thus that data's catalog or data storage information is maintained or stored on the mainframe in a mainframe compatible storage format. Though the first computing system providing the data access server can access (e.g., read and write) the data according to this invention, the first computing system is generally not the primary computer system responsible for maintaining the data.

The operation using this configuration includes accepting, by the data access server from a data access client via a distributed data protocol, a request for access to the data and then obtaining storage characteristics of the data in the shared storage device by querying the second computing system. The operation continues by creating a virtual file system maintained by the data access server based on the storage characteristics of the data obtained from the second computing system. Finally, the operation concludes by determining if the virtual file system contains sufficient information to service the request by the data access server on the first computing system, and if so, servicing the request for access to the data, and if not, obtaining data storage information from the second computing system to properly service the requests and entering the obtained data storage information into the virtual file system in order to maintain the virtual file system and using the obtained data storage information to service the request. This arrangement then allows the data access server on the first computing system to create another file system for the data, that is separate from a file system or other catalog information provided by the second computing system (e.g., a mainframe) to primarily maintain the data. The virtual file system thus provides a compatibility bridge that can be quickly accessed by the data access server to serve the data to clients. Such a virtual file system supplies needs that are generally required by file sharing protocols such as NFS or CIFS, which generally expect a hierarchical file system format.

Other arrangements of the invention that are disclosed herein include software programs to perform the data access and server operations summarized above. More particularly, a computer program product is disclosed which has a computer-readable medium including computer program logic encoded thereon in the form of code implementing a data access server. The computer program logic, when executed on at least one processing unit with a computing system, causes the processing unit to perform the operations of serving data as indicated herein and as summarized by the methods and operations above. Such arrangements of the invention are typically provided as software on a computer readable medium such as an optical, floppy or hard disk or other such medium such as firmware in a ROM or RAM chip. The software can be installed onto a computer to perform the techniques explained herein. Accordingly, just a disk or other computer readable medium that is encoded with software or other code (e.g., object code) to perform the above mentioned methods, operations and/or their equivalents is considered to be an embodiment of the invention, even without a computer system or other hardware to actually load and execute or otherwise perform the software.

The system of the invention can be embodied strictly as a software program, as software and hardware, or as hardware alone.

Other arrangements of the invention include a first computing system providing access to shared data. The first computer system includes a processor, a memory system and a shared storage interface coupling the first computing system to a shared storage device in which the shared data is maintained by a second computing system in a manner that is not natively compatible to the first computing system. The computing system further includes an interconnection mechanism coupling the processor, the memory system and the shared storage interface and a network interface coupling the first computing system to a network and the second computing system. The memory system in such an embodiment is encoded with a data access server which executes on the processor in the first computing system. When executing, the data access server receives, via the network interface, a client message to access data on the shared storage device and in response to receiving the client message, retrieves, via the network interface, data storage information provided from the second computing system coupled to the first computing system. The data storage information is stored in the memory system and allows the data access server on the first computing system to access the data in the shared storage device in a manner that is compatible with the first computing system. The data access server provides access, via the network interface, to the data on the shared storage device in conformance with the client message based on the retrieved data storage information.

In another arrangement, a virtual file system is encoded within the memory system. Furthermore, the data access server is further encoded with logic, that when executed on the processor, determines if appropriate data storage information is available in the virtual file system based on client request parameters in the client message received via the network interface. If not, the data access server when further executed causes the processor to select at least one first data access routine based on a protocol command specified by the client message and causes the processor to perform the first data access routine to allow the data access server on first computing system to communicate over the network interface with the second computing system to request the data storage information from the second computer system. The system also receives a response to the data access routine from the second computer system via the network interface and parses the response to the at least one data access routine to determine the data storage information. The system then places the data storage information into the virtual file system maintained by the data access server in the memory system.

If appropriate data storage information is available in the virtual file system based on client request parameters in the client message received via the network interface, then the data access server when further executed causes the processor to translate client request parameters contained in the client message into data access parameters useable for the selected data access routine(s). The translator uses data storage information contained in a virtual file system to provide a location in the shared storage device of data for which access is specified in the client request message.

Another arrangement provides for a computer system including a data access server. The data access server is encoded as a process and includes a distributed data interface, a plurality of data access routines, a data access translator, and a means for maintaining a virtual file system. The data access server executes in the computer system to accept, via the distributed data interface, a request for access to the data from a data access client via a distributed data protocol. The system then obtains, via the data access translator and data access routines, storage characteristics of the data in the shared storage device by querying the second computing system. The system also maintains, via the data translator, the virtual file system based on the storage characteristics of the data obtained from the second computing system. The system also determines, via the data access translator, if the virtual file system contains sufficient information to service the request by the data access server on the first computing system, and if so, services the request for access to the data via data access routines and the distributed data interface. If not, the system obtains data storage information from the second computing system via the data access routines to properly service the requests and enters the obtained data storage information into the virtual file system via the data access translator in order to maintain the virtual file system. The system also uses the obtained data storage information to service the request via the distributed data interface.

Yet another arrangement of the invention provides a system that includes a first computer system providing access to data stored in a shared storage device managed by a second computing system. In this configuration, it may be the case that a data storage format provided in the shared storage by the second computing system is incompatible with a data storage format required by the first computing system. This is not a requirement however and the invention can work as described between first and second computing system that are the same or different architectures and that use the same or different file systems, data storage formats, and so forth. In any event, the first computing system includes a distributed data interface means for receiving, at a data access server performed on a first computing system, a client message to access data on the shared storage device. In response to receiving the client message, a data access routine retrieving means is included that retrieves data storage information provided from the second computing system coupled to the first computing system. The data storage information allows the first computing system to access the data in the shared storage device in a manner that is compatible with the first computing system. The distributed data interface means generally provides access to the data on the shared storage device, directly from the data access server, based on the retrieved data storage information.

An example implementation of the invention that incorporates many of the aforementioned embodiments is the InstaShare File Server which is incorporated as part of the InstaShare software library (also called SymmAPI-Access) that is manufactured by EMC Corporation of Hopkinton, Mass. While some aspects of InstaShare are explained above with respect to FIG. 4, the system of the invention explained herein, which can be incorporated into InstaShare, is not considered prior art, nor are such operations, aspects, apparatus or techniques disclosed here a part of the functionality of the system explained with respect to FIG. 4. In other words, the system of FIG. 4 represents prior versions of InstaShare, whereas certain embodiments of the invention presented herein represent advancements which can be incorporated into InstaShare, if so desired. For a complete description of the use and operation of this product, the reader is directed to the InstaShare user and programmer manuals and particularly to the sections concerning the InstaShare File and Data Sharing system. These manuals will be available from EMC Corporation. Such manuals are hereby incorporated by reference in their entirety.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 7A illustrates a block diagram architecture of an example embodiment of a data access server configured according to the invention.

FIG. 7B illustrates an example of a typical client message exchanged between a data access client and the data access server of the invention, wherein the client message includes example client request parameter values for an example NFS READ command.

DETAILED DESCRIPTION OF PREFERRED EMBODIMENTS

The present invention generally provides a system including mechanisms and techniques to serve remotely managed data from a shared storage device using distributed data sharing techniques. As will be explained, the system of the invention allows conventional software applications that require no modifications to execute or otherwise perform on many different network computing platforms and to use conventional distributed data sharing protocols (e.g., NFS or CIFS) to access a data access server for access to the data served from the shared storage device. A computing system, however, such as a mainframe that is physically different and that potentially uses a different data storage format than the computer system executing and providing the data access server can primarily manage and maintain the data. The following brief example of the invention will assist the reader in understanding more detailed aspects and embodiments of the invention which are presented and discussed later.

Figure 1:
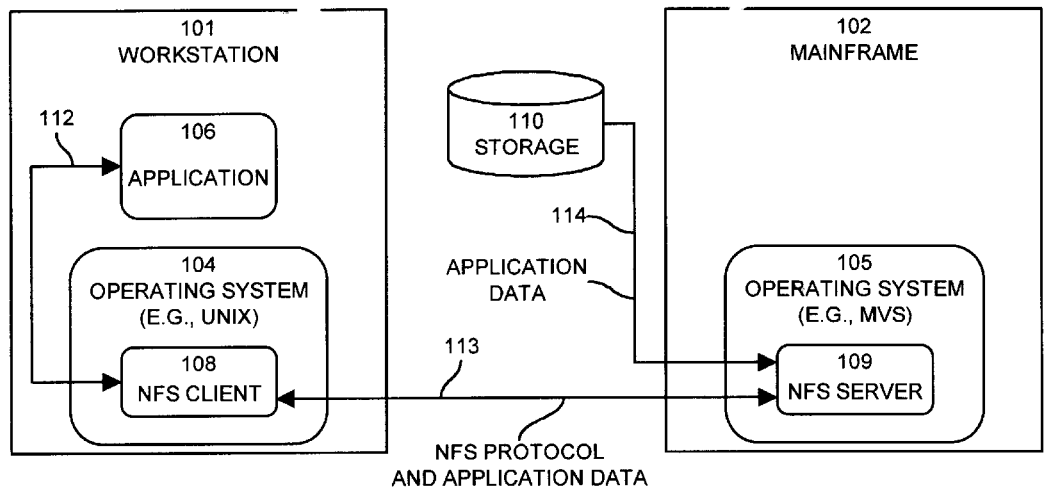
FIG. 1 illustrates a prior art technique that allows an application on a local host to obtain access to data on a remote host using a distributed file system protocol such as the Network File System (NFS).
Figure 2:
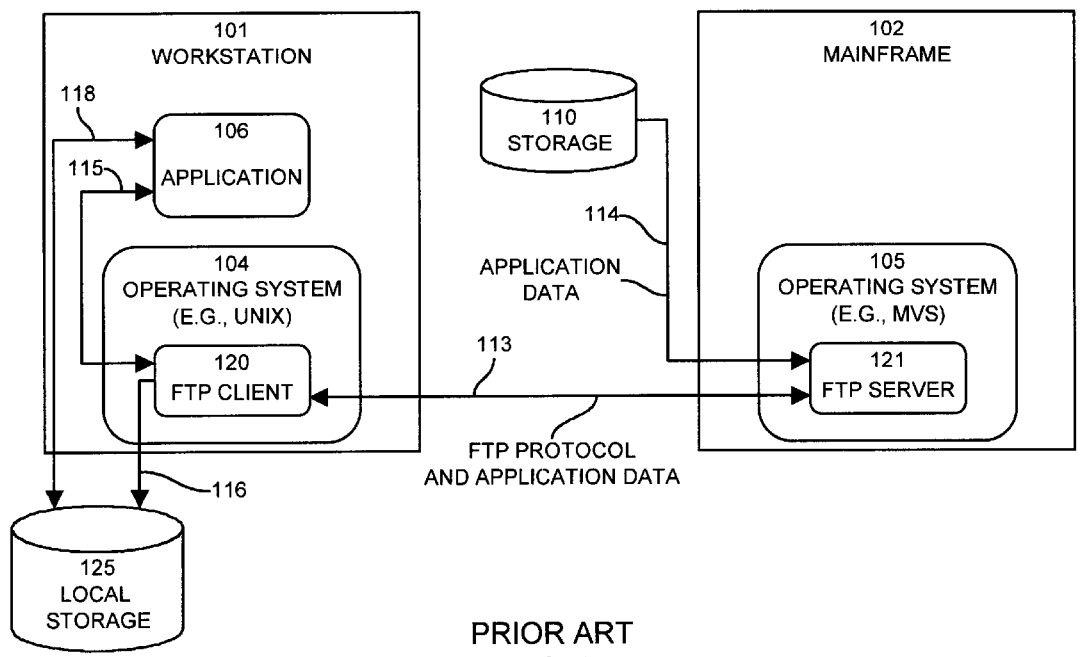
FIG. 2 illustrates a prior art technique that allows an application on a local host to obtain access to data on a remote host by transferring an entire copy of the data to the local host using a File Transfer Protocol (FTP).
Figure 3:
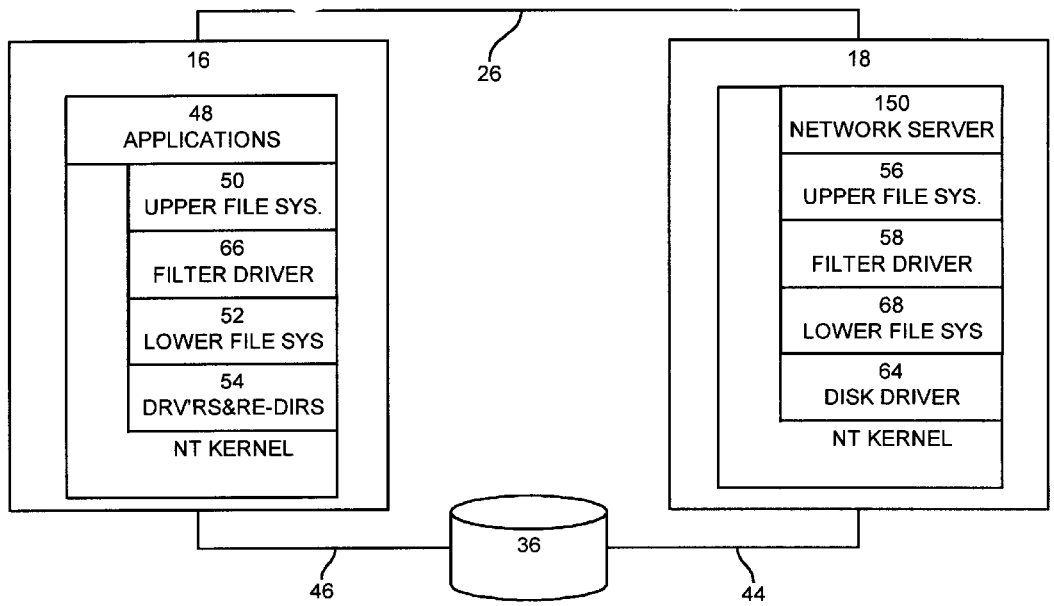
FIG. 3 illustrates a data sharing technique described in U.S. Pat. No. 5,950,203 that requires each computing system that shares data to be directly coupled to a shared storage device.
Figure 4:
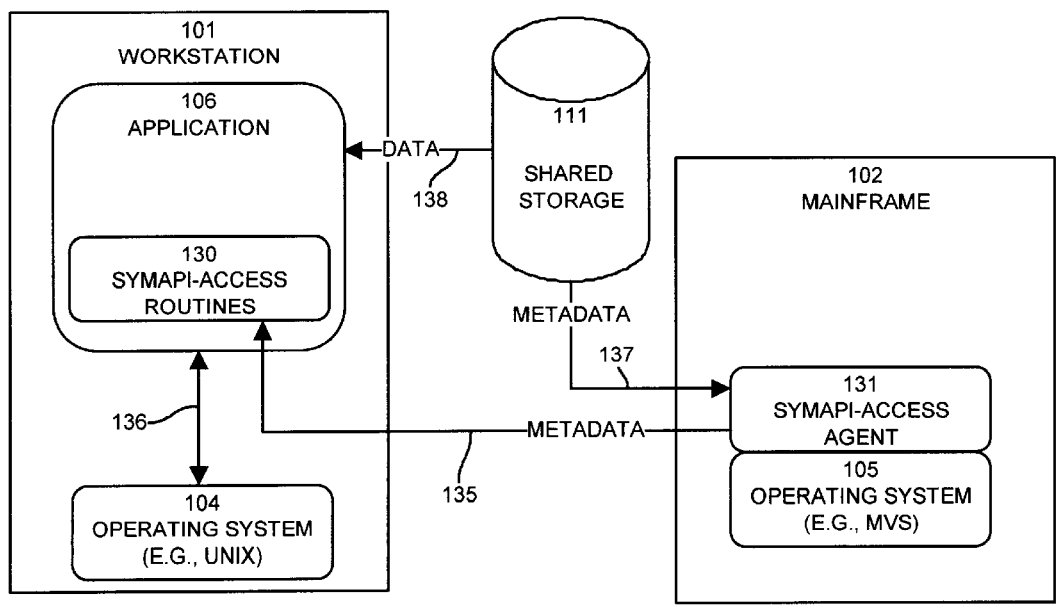
FIG. 4 illustrates one aspect of a data sharing technique provided by a former version of the software product called InstaShare (also called SymmAPI-Access), produced by EMC Corporation of Hopkinton, Mass., which allows an application on remote host to obtain access to data stored in a shared storage device via an agent on a remote host and via a direct connection to the shared storage device.
Figure 5:
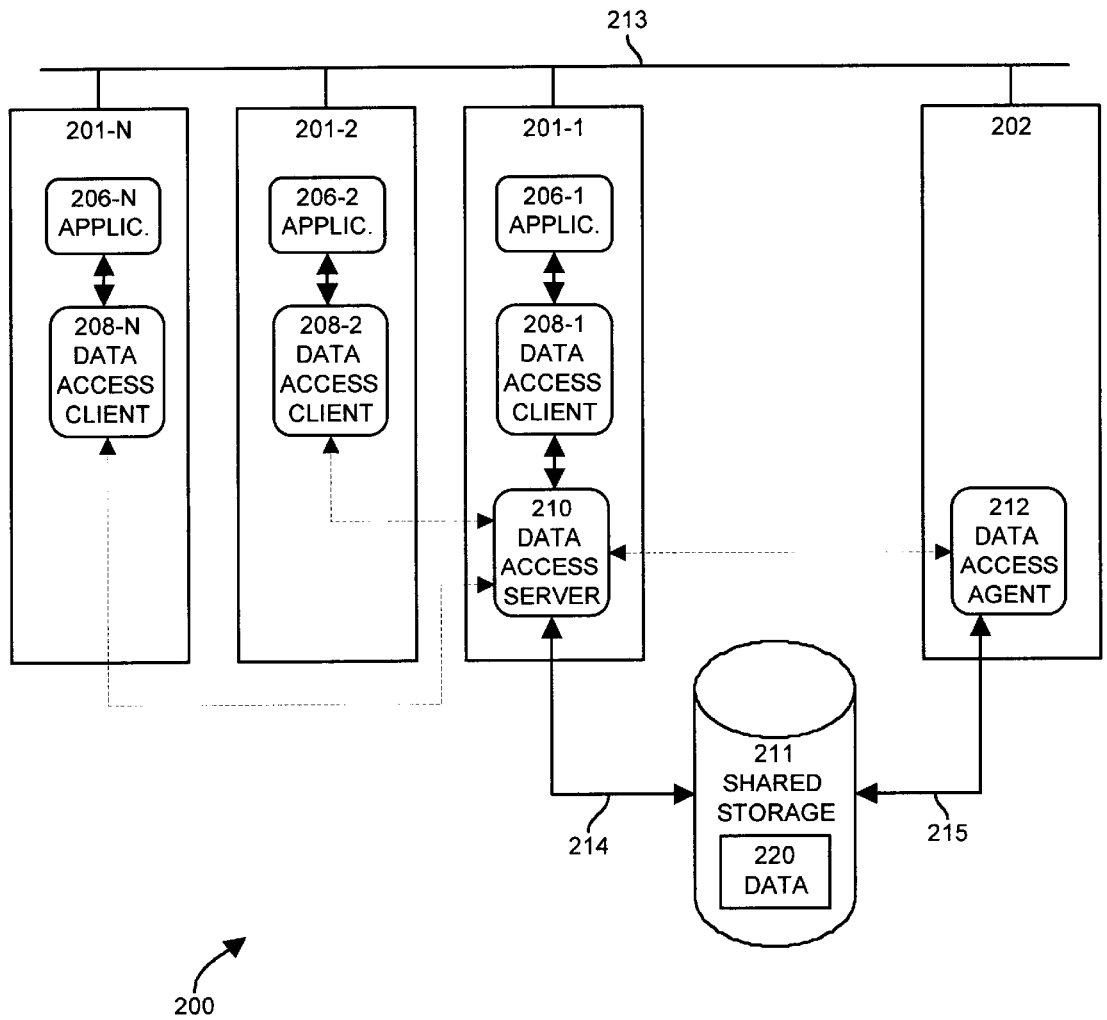
FIG. 5 illustrates a high level operation of the system of the invention which provides access to data in a shared storage device by applications that are performed on computing systems which may or may not be directly connected to the shared storage device.

FIG. 5 illustrates an example of a computing system configuration 200 which is useful for explaining high level principles of the invention. The example configuration 200 includes computing systems 201-1 through 201-N and 202, each of which is coupled to a network 213. A shared storage device 211 is coupled to the computing systems 201-1 and 202 via respective data interfaces 214 and 215. In this configuration 200, the computing systems 201-1 through 201-N may be, for example, open systems computing platforms such as workstations or personal computers that operate using an open systems operating system (not specifically shown) such as a variant of Unix or Microsoft's Windows 95/98/NT/2000 operating system. Windows 95/98/NT and Windows2000 are trademarks of Microsoft Corporation of Redmond, Wash. The computing system 202 may be a mainframe computer system that runs a mainframe operating system such as IBM's MVS or OS/390 operating system (not shown in this figure). The shared storage device 211, of which there may be more than one, may be a large capacity multi-disk storage system such as one of the Symmetrix line of data storage systems produced by EMC Corporation of Hopkinton, Mass. Shared storage 211 may be any type of data storage system, so long as the computing systems 201-1 and 202 each includes a direct coupling to the shared storage 211. It is noted here that computing systems 201-2 through 201-N need not be coupled to the shared storage device 211, though they may if desired.

In this example, the mainframe computing system 202 is primarily responsible for maintaining the data 220 within the shared storage device 211 via interface 215. The mainframe computing system 202 may store the data 220, for example, in one or more MVS data sets within a portion of the shared storage device 211. The invention allows various software applications 206-1 through 206-N that perform on respective computing systems 201-1 through 201-N to access (e.g., read) the data 220 by communicating with data access clients 208-1 through 208-N, which also perform on the computing systems 201-1 through 201-N.

Generally, the same computing system 201 performs the application (e.g., 206-2) and its corresponding data access client 208 (e.g., 208-2 for application 206-2). In response to communications from the application(s) 206, that application's respective data access client 208 in turn communicates using one or more distributed data access protocols (e.g., NFS or CIFS, not specifically shown in this figure) with a data access server 210 performed on the computing system 201-1 to obtain access to the data 220 on behalf of the respective applications 206. The communications between the client 208 and the server 210 need not be via a specific protocol, however, and any sort of communication to obtain access to the data can be used, though some sort of protocol is preferred. For data access clients such as 206-2 through 206-N that perform on computing systems 201-2 through 201-N which are different than the computing system 201-1 upon which the data access server 210 performs, the clients 208 and server 210 perform communications using the distributed data access protocol(s) over the network 213. However, the system of this invention can also use distributed data access protocols to communicate between a data access client such as 208-1 and the data access server 210, which in this example both perform on the same computing system 201-1. The network 213 can be any type of physical or wireless communications mechanism, including a TCP/IP network such as the Internet.

In response to receiving client messages requesting access to the data 220, the data access server 210 retrieves data storage information (not shown) provided from the mainframe computing system 202. The data storage information may be, for example, mainframe catalog information which indicates how the shared storage device 211 stores the data 220. In this particular example, the data access server obtains the data storage information by communicating over the network 213 with a data access agent 212 that performs on the computing system 202 (e.g., the mainframe in this example). The data access agent 212 returns the data storage information to the data access server 210 which allows the data access server 210 on computing system 201-1 to provide access to the data 220 in the shared storage device 211 in a manner that is compatible with the computing system 201-1. The data access server 210 provides such access on behalf of the data access client 208 (and therefore that client's respective controlling application 206).

By way of a specific example, the open systems computing system 201-1 that performs according to a Unix or Windows operating system is able to use the data storage information (e.g., the MVS catalog information provided by the data access agent 212) to properly read the data 220 from an MVS data set maintained by the MVS mainframe computing system 202 within the shared storage device 211. Once the data access server 210 has performed the read operation in response to a client message requesting such read access and has obtained the data, the data access server 210 can return the data 220 that was read to the client 208 in another client message using a distributed data access protocol associated with that client 208. Such a protocol may be NFS or CIFS for example, in which case the data access server 210 appears to the data access clients 208 as a regular NFS or CIFS server on the network 213 (or within the computing system 201-1 for client 208-1). However, in this example, NFS and CIFS are not used to interface with the mainframe computing system 202 or the shared storage device 211. Instead, the data access server 210, as will be explained, can use data access routines that first obtain the data storage information required for the data access. The data storage information, as in the example above, may be obtained from the computing system 202 via network 213 for particular data 220 to be accessed, or it may have been previously obtained in which case the data access server can use a cached version of the data storage information to access the data 220. Once obtained, the data access server 210 can then obtain the actual data 220 itself, directly from the shared storage device 211 via interface 214.

As will be discussed in detail later, the data access server 210 in some embodiments can actually create and maintain a virtual file system (not shown in this figure) based on the data storage information obtained from the data access client 212. The virtual file system can serve as a compatibility bridge between the foreign data storage format(s) used by computing system 202 (e.g., a mainframe data set format) and a format that is more compatible with the protocols used to access the data between the clients 208 and the server 210. As a simple example, the data access server can create a Unix-like hierarchical virtual file system based on data storage information obtained from the data access agent 212. The virtual file system does not actually store the data 220. Rather, it just maintains information that can be considered a mapping which can be used to assist in the translation of client protocol messages requesting data access that are sent to the data access server 210 (via clients 208) to the actual data 220 stored on the shared storage device 211.

In this manner, the system of the invention generally allows data formats such as MVS data (e.g., 220) to be served remotely from a computing system (e.g., 201-1) other than the computing system (e.g., 202) that is primarily responsible for managing the data. In a preferred embodiment, as illustrated in this example, due to the nature of the differences in data storage formats (e.g., file system formats) between the computing systems 201-1 through 20-N versus computing system 202, the system of the invention still provides applications 206 with access to the data 220 regardless of these incompatibilities that may exist. The access is provided without requiring changes to code of the applications 206.

Further still, such access is provided using distributed data exchange protocols, which are preferably standardized, between the clients 208 and the server 210. This aspect of the invention allows for no changes to code within the data access clients 208 and/or the computing systems 201. The invention also alleviates the need for the computing system 202 (e.g., the MVS mainframe) that is responsible for maintaining the data 220 in the shared storage device 211 from having to use processor cycles and network bandwidth to provide the requested access to the data 220 for the other computing systems 201 via the network 213. Instead, only the relatively small amount of data storage information is provided via the data access agent 212 to the computing system 201-1 that performs the data access server 210. Once obtained, the data access server 210 can use interface 214 for direct access to obtain the actual data 220 without assistance from the computing system 202.

Figure 6:
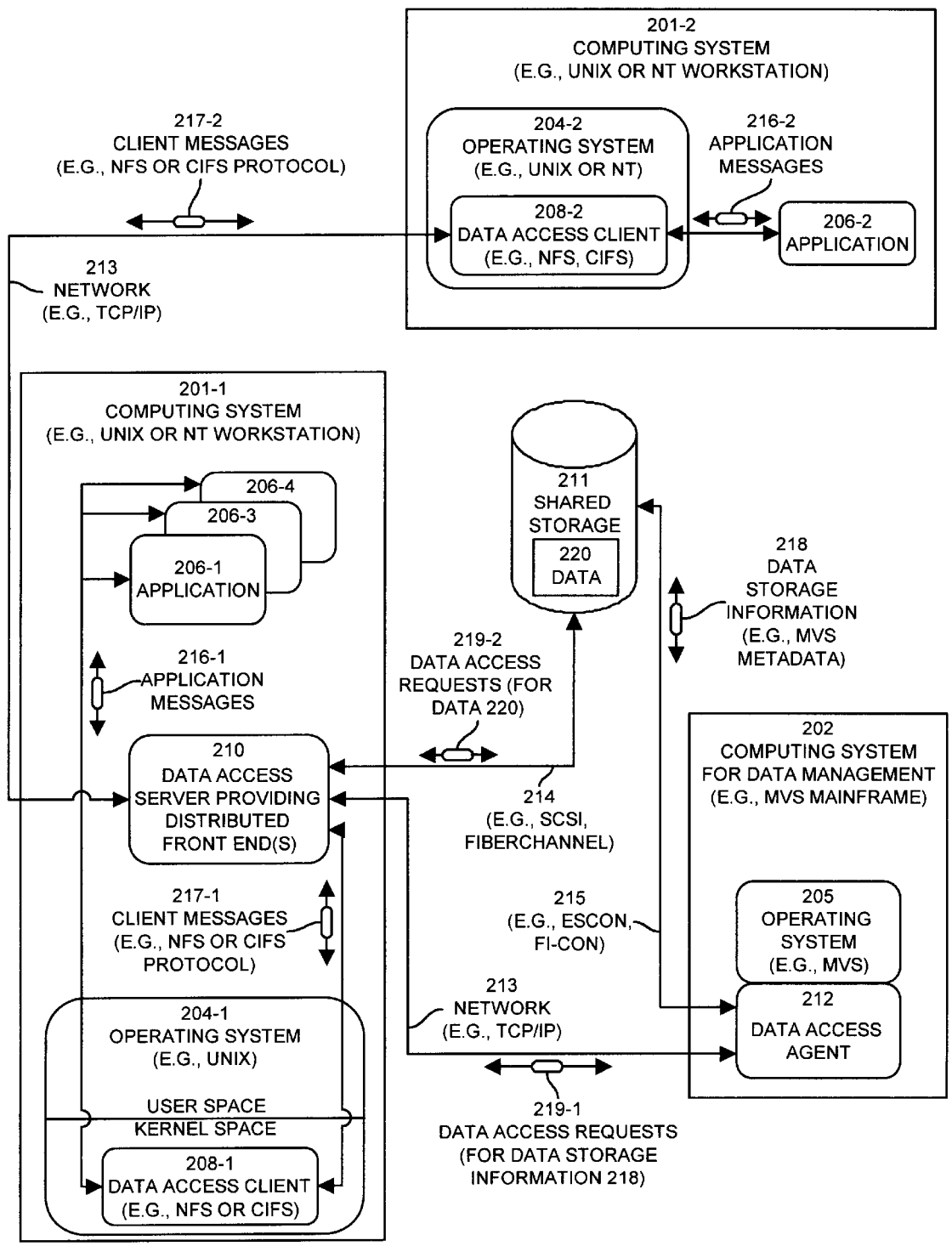
FIG. 6 illustrates a more detailed operation of the system of the invention including the interaction of applications using data access clients to access shared data provided by a data access server configured according to the invention.

FIG. 6 illustrates a more detailed example of computing systems 201-1, 201-2 and 202 as configured to generally operate according to the invention as explained above with respect to FIG. 5. The invention is primarily embodied within the data access server 210 in the computing system 201-1. In this example, applications 206-1, 206-3 and 206-4 are performed by the computing system 201-1, as is the data access server 210, while application 206-2 is performed on computing system 201-2 and communicates over the network 213 with the data access server 210 via client 208-2. The term "perform" as used herein means that a server, client, agent or application is executed, interpreted or otherwise processed or performed as a task, process, routine, program or other entity on a processing unit (not shown in this figure) within a computing system.

Also in this example illustration, the computing system 202, which is an MVS mainframe, is coupled to the shared storage device 211 via a high speed peripheral data interface 215 such as an ESCON or FI-CON connection. The MVS operating system 205 controls the operation of the mainframe 202 and generally governs which processes are able to access (e.g., read from or write to) those portions of the shared storage device 211 allocated to the mainframe 202. The data 220, which is managed in this manner, is stored, for example, in an MVS data set. MVS file system and data storage formats are generally considered incompatible with many other storage formats such as the open systems data and file system storage formats used by Unix, Microsoft's Windows (95/98NT/2000) operating systems, and many other types of operating systems. However, the actual data 220 itself in the form of bits, bytes, words and so forth that are stored within the MVS data set may be compatible with applications 206 that can run across all computing systems 201-1 through 201-N, as well as on the mainframe 202.

An example of such an application 206 is a software application that reads text data. While the text data (e.g., 220) may have originally been created by an application (not shown) on the mainframe 202 (hence the reason why mainframe 202 is primarily responsible for managing and "owns" such data), applications 206-1 through 206-N on other architectures may require or have a need to access such text data 220. The text data (e.g., 220) itself may be compatible between each text data application, but the way in which it is stored by the mainframe 202 in the shared storage device 211 might be generally incompatible with the mechanisms used to read, write and/or otherwise access the shared storage device 211 by the computing system 201-1 (e.g., an open systems platform).

As briefly discussed above (FIG. 5) and as shown in a bit more detail in FIG. 6, to obtain such access, the applications 206 communicate via application messages 216 to respective data access clients 208. In this example and in a preferred embodiment, the data access clients 208 are conventional clients used for standardized data exchange protocols that may be, for instance, provided as part of the operating systems 204 that control the various computing systems 201 (201-1 and 201-2 in this example). This is illustrated in the example in FIG. 6 as the data access client 208-1 performs within the kernel space of the Unix operating system 204-1 in computing system 201-1.

An example of such a client 208 is an NFS client provided as part of a version of the Unix operating system.

Alternatively, a client 208 can be a proprietary client that is provided outside of the operating systems 204 (i.e., in user space) as a separately performing entity which provides some sort of proprietary communications capabilities. In any event, the application messages 216 provided from an application 206 to a data access client 208 are typically embodied as system calls to the operating system 204 (or to the client 208 executing in standalone mode or to a client operating in user space) to access data in some manner. Assuming the example data access client 208 is an NFS client, examples of such application messages 216 providing systems calls are those calls used to access files and file systems, such as read, write, open, close and so forth.

The application messages 216 generally indicate an identity of the data 220 to be accessed and indicate a manner of access (e.g., to read or write to a file containing the data) to be provided to the data 220 on behalf of the application 206. The data access clients 208 are generally aware of which data access server (e.g., 210 in this example) provides such access to the requested data. In the case of this invention, such a server is the data access server 210 which provides a distributed data interface to send and receive of client messages 217 that are properly formatted according to the distributed data protocol implemented between the client 208 and the server 210. In the case of file system access, the clients 208 therefore use a distributed data protocol such as a distributed file system protocol (e.g., NFS or CIFS) to exchange client messages 217, which are formatted according to the standard NFS or CIFS protocols, with the data access server 210.

Client messages 217-2 may be exchanged between the data access client 208-2 and the data access server 210 over the network 213 for computing system 201-2, while client messages 217-1 may be exchanged via local inter-process communication (IPC) mechanisms that remain completely within the computing system 201-1 for the applications 206-1, 206-3 and 206-4, as they are performed on the same computing system 201-1 as the data access server 210. The messages 217-1, however, are still preferably formatted according to the distributed data protocol provided by the distributed data interface presented by the data access server 210. The client messages 217 preferably contain a data access command formatted in accordance with the distributed data protocol (e.g., an NFS protocol command) and indicate a type of access to be provided to the data 220 (e.g., read, write) on behalf of the data access client 208. In other words, this aspect of the invention allows, for example, an application 206-3 that performs on computing system 201-1 to access a locally performing NFS client 208-1 which in turn communicates using the NFS protocol with the locally performing data access server 210, even though none of the communications takes place over the network 213.

In this manner, the data access server provides a consistent and standard "front-end" distributed data protocol interface for whatever type of data is being accessed and served. Different protocols may be supported by the same or different data access servers 210, while only one server 210 is shown in this example. By distributed, what is meant is that the data access server 210 is available to serve any number of data access clients 208 that may be present on any computing system 201 (via the network 213 or via IPC mechanisms internal to computing system 201-1) according to the formalities and client messaging requirements imposed by the protocol(s) supported. As will be explained shortly, a distributed file system data exchange protocol such as NFS or CIFS is used in some preferred embodiments of the invention and the data access server 210 actually presents the "look and feel" of an NFS or CIFS file system that stores the data 220 from the viewpoint of the data access clients 208. In other words, the data access server 210 in some embodiments actually serves the data 220 as if it were stored and maintained in an open Unix (using NFS) or Windows (using CIFS) file system from the perspective of the data access clients 208.

On the "back-end" of the data access server 210, the network 213 is also used at times to provide a transport means to allow data access requests 219-1 to be passed between the data access server 210 and the data access agent 212 in the computing system 202. Such data access requests 219-1 are used to obtain the data storage information 218 concerning the data 220 for which access has been requested at the data access server 210. The data storage information 218 is generally information that may contain, among other things, a file or partition layout, size, address range, volume identity, storage device identity, disk extent information, or other required information that indicates where the data 220 is actually located within the shared storage device and that provides an indication if the data 220 is available for access or not (e.g., is locked or not by another process, user, or the like). The data storage information 218 thus generally contains any information required by the data access server 210 to properly access the data 220 within the shared storage device 211, but does not actually contain the data 220 itself. As will be explained shortly, not all client messages 217 received by the data access server 210 demand or cause a data access request 219-1 to be sent to the data access agent 212, since in certain embodiments, formerly obtained data storage information 218 may be cached in the data access server 210 for future use. This is preferably done by maintaining a virtual file system in the computing system 201-1 based on the data storage information 218, as will be explained later.

Once the data access server 210 has obtained the required data storage information 218 via one or more data access request(s) 219-1, the data access server 210 can then provide other data access requests 219-2 to the shared storage device 211 to obtain access to the data 220 based on the data storage information 218 as per requests specified by client messages 217. Such data access is provided over the direct connect interface 214 between the computing system 201-1 and the shared storage device 211, hence the named "shared" storage device. The interface 214 may be any type of peripheral device or interconnect interface such as a version of a SCSI interface (fast wide, dual, high speed, etc.) or a fiber-optic (e.g., fiber-channel) interface. Since the shared storage device in typical embodiments is some sort of high speed random access storage, such as a disk, tape, optical media, or other high speed bulk memory or disk storage system, any interface used to access such types of mass storage devices is acceptable to use as interface 214.

FIG. 7A illustrates a high level block diagram architecture 245 of the data access server 210 (FIGS. 5 and 6) configured according to various embodiments of the invention. Generally, the architecture 245 provides various distributed data interfaces 250-1 through 250-N, a data access translator 260, data access routines 270, optionally but preferably a virtual file system 275, and certain operating system hooks 276. Each of these components 250, 260, 270, 275 and 276 is preferably embodied as one or more software modules (e.g., routines, procedures, functions, tasks, threads or other executable, interpretable or performable code, instructions or logic statements) within a program or task that comprises the data access server 210.

Each distributed data interface 250 supports communications and preferably so using at least one distributed data protocol. Examples of such supported protocols are: distributed file system protocols such as NFS (250-1) and CIFS (250-2); distributed application programming interfaces (APIs) such those provided using Java or a Java Beans API or messaging protocol (250-3), a Common Object Request Broker API (CORBA data exchange protocol, 250-4) or a COMs API (250-5) or other suitable distributed data sharing protocol(s) (250-6). The examples provided are not meant to be limiting as there are many other distributed client-server data exchange protocols (250-N) in existence with allow clients such as the data access clients 308 to interface with and exchange data in a standardized manner with a server such as the data access server 210 of this invention. Other such well known examples which are not specifically shown in the figure include the Hyper-Text Transfer Protocol (HTTP), mail protocols such as the Simple Mail Transfer Protocol (SMTP) and other data sharing protocols. Preferred embodiments of the distributed data interfaces 250 support file system protocols such as NFS and CIFS which allow the data access server 210 to be a file server with respect to data access clients 208.

It is also to be understood that the protocols supported by distributed data interfaces 250-1 through 250-N may be network or Internet based, but that the communications received (i.e., from the clients 208) via the distributed data interface(s) 250 using such protocols are not required to be carried out over the network 213. This is the case, for example, with data access client 208-1 (FIGS. 5 and 6) that performs on the same computing system 201-1 as the data access server 210. One purpose of the distributed data interface 250 (collectively referring to 250-1 through 250-N) is to provide a standard mechanism by which applications 206 can communicate with the data access server 210 via the data access clients 208. Since the data access server 210 of this invention provides such standardized protocol interfaces as a "front-end" to the data access clients 208, no modifications are needed to applications 206 or their clients 208.

One small exception to the general principle that applications 206, clients 208 and user computing systems 201 in general need no modification to work with the invention is explained at the end of this detailed description. This exception generally provides for a command, program or other entity (not shown) which a user of an application 206 can execute on a computing system 201 to provide the data access server 210 with authentication information such as a username and/or password. Such authentication information can be used by the data access server 210 to authenticate data access requests to the mainframe computing system 202. Such an extension to the computing systems 201 is only required if the computing system 202 responsible for maintaining the data 220 requires special access controls to authenticate users or other programs that attempt access to the data. This exception is not required in all embodiments of the invention and is only discussed here for completeness.

The example architecture 245 of the data access server 210 according to this invention also includes a data access translator 260 that inter-operates with the distributed data interface 250 and a set of data access routines 270. The data access translator 260 performs a variety of functions that will be explained in more detail shortly. Generally, one such function is to map, parse or translate client request parameters (not shown in this figure). contained in the client messages 217 (FIG. 6) that are received via the distributed data interface(s) 250 into data access parameters (not shown) useable by the data access routines 270. In other words, the data access translator 260 converts information within the distributed data protocol commands (e.g., NFS commands) into information that can be used to perform one or more data access functions specified by those protocol commands (e.g., an NFS read command to read data) to obtain access to the data 220 in the shared storage device 211.

Once the data access translator 260 has mapped the protocol commands to various data access routines 270, the data access routines 270 can be used to communicate between the data access server 210 on computing system 201-1 and the data access agent 212 on the mainframe computing system 202 to obtain the data storage information 218 required to perform the action(s) (e.g., read data 220) specified via the distributed data protocol command (not shown) in the client message 217. Alternatively, if the data access translator 260 determines that the virtual file system 275 contains the required data storage information 218 in response to a client message 217 requesting access to the data 220, the data access translator can get the data storage information from the virtual file system (as will be explained) and can provide the required information to the data access routines 270 to allow the routines 270 to access the data in the shared storage device 211. The operating system hooks 275 are also included as part of the architecture 245 of the data access server 210 to allow the data access server 210 access to operating system functions on computing system 201-1 as needed.

FIG. 7B illustrates an example of various client request parameters 262-1 through 262-M that may be contained within a client message 217. This simple example client message 217 illustrates some of the content that may be passed between the data access client 208-1 and the data access server 210 using the NFS protocol (via distributed data interface 250-1 in FIG. 7A). According to this example, the client request parameters 262-1, 262-2 and 262-3 indicate that the client message 217 is an NFS "READ" command (parameter 262-1) sent from the data access client 208-1 (parameter 262-2) to the data access server 210 (parameter 262-3) to read fifty units (e.g., blocks, sectors, bytes, bits, records, or other data measurement) of data (parameter 262-5) from the file "data" 220 (parameter 262-5) maintained in the shared storage 211. This example client message 217 is provided merely to indicate information that can be specified in a typical client message 217 and is not meant to exactly or accurately represent the entire contents of an actual NFS READ command. Rather, the example is provided for illustrative purposes only and is not meant to be limiting. Other information (client request parameter 262-M) can be included in the client messages 217 as well. Such other information 262-M may include data to be written to the shared storage device 211 (in the case of an NFS WRITE command), for example.

In any event, as explained with respect to both FIGS. 7A and 7B, the data access translator 260 obtains one or more client request parameters 262 from the client message 217 and maps such client request parameters 262 to any data access routine parameter(s) (not shown) required for performance of one or more data access routines 270. Using these parameters, the data access routines 270 can obtain data storage information 218 from the mainframe 202 (FIGS. 5 and 6) (or locally, if cached in the virtual file system 275, as will be explained) and can then use this data storage information 218 to perform the action specified in the client message 217 (a read in this example) in a manner that is compatible with the computing system 201-1 that performs the data access server 210.

The data access translator 260 can also translate or map a response containing, for example, the data 220 from a data access routine 270 (i.e., the data 220 that was read from shares storage device 211) into appropriate client request parameters 262 in order to generate a return or reply client message 217 which can be returned to the appropriate data access client 208. In other words, just as the data access translator 260 can translate distributed data protocol commands (formatted client messages 217) having parameters 262 into parameters to allow the data access routines 270 to access the data 220, once the data 220 is accessed as specified by those protocol commands (e.g., once the data has been read or written or otherwise accessed), the data access routines 270 can return the data 220 that was, for example, read, to the data access translator 260 which can then format one or more reply client messages 217 that contain this data 220 and can then send those reply client messages 217 containing the data 220 back to the clients 208 using an appropriate distributed data interface 250 (as defined by the protocol used between the client 208 and the sever 210 to which the client message 217 received was formatted). The data access translator 260, as its name implies, thus acts as a translator between the protocols used to access the server 210 and the data access routines used to access the data 220 in the shared storage 211.

Figure 8:
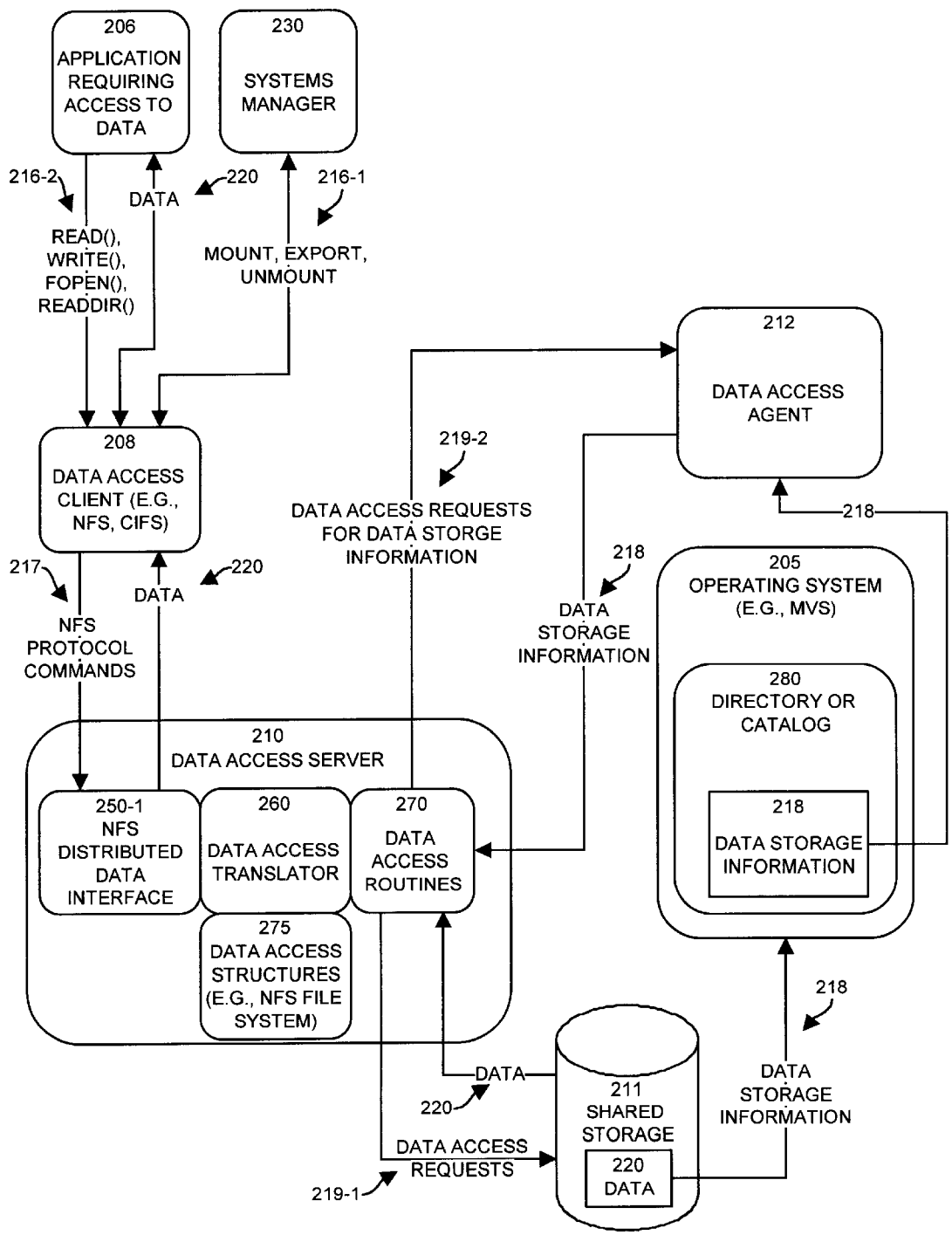
FIG. 8 illustrates an example operation and embodiment of a data access server that supports data sharing via a distributed file system protocol and that maintains a virtual file system for shared data according to the invention.

FIG. 8 illustrates an example operation of the various software components that comprise an example embodiment of the invention. The example embodiment shows the architecture 245 (FIG. 7A) of the data access server 210 as it is used to provide access to the data 220 on behalf of the applications 206. This particular example illustrates such access using the NFS distributed data interface 250-1 and includes example NFS commands and data flows provided to and from the data access server 210. It is assumed here that the reader is generally familiar with the various NFS commands that can be used to remotely control access to file system data via an NFS client (e.g., an NFS client 208). For further information on the operation and use of NFS and the NFS protocol, the reader is encouraged to review the NFS protocol specification and operation discussed in Request For Comment (RFC) 1813 (RFC-1813) "NFS Version 3 Protocol Specification" published by the Network Working Group of the Internet Engineering Task Force (IETF) in conjunction with Sun Microsystems, Inc. Another source for information on the NFS protocol is a book entitled "Protocols for Internetworking: XNFS, Version 3W" published by The Open Group, Berkshire RG1 1AX, United Kingdom ISBN: 1-85912-184-5. The entire teachings and contents of each of these documents is hereby incorporated by reference.

The data access server 210 in this embodiment includes the distributed data interface 250-1 (supporting NFS in this example), the data access translator 260, the data access routines 2760, and a virtual data access file system 275. Components 250-1, 260 and 270 generally operate as explained above. However, in this embodiment, the data access server 210 also provides data access structures 275 (otherwise referred to as a virtual file system in embodiments that support file system protocols such as NFS and CIFS). The data access structure 275 is created by the data access server 210 and provides a representation of storage for the data 220 that is compatible or native to the computing systems 201 that perform application 206 that require access to the data. In the preferred embodiment represented in FIG. 8, the data access structure 275 is a representation of a virtual file system provided by the data access server 275 that appears to the NFS or CIFS or other file sharing clients 208 and their respective applications 206 to be a regular NFS, CIFS or other such file system containing data 220 that can be read as a file.

In operation of the system in FIG. 8, the NFS distributed data interface 250-1 supports NFS protocol communications 217 between NFS data access clients 208 which are directed 216 by applications 206 and systems administrator(s) 230 (also called systems managers). Systems administrators 230 are persons generally responsible for managing computing systems such as the computing systems 201 (FIGS. 5 and 6). The systems administrator 230 of computing platform 201-1 can provide, for example, NFS commands 216-1 (via data access client 206) to the data access server 210 to instruct the data access server 210 to "export" a file system contained within the data access structure 275 (e.g., export the virtual file system) provided by the data access server 210 to allow access via NFS to the data 220. Instead of exporting a true MVS file system that maintains the data 220 within the shared storage 211, the data access server 210 exports the virtual data access structure 275 that appears to be, for example, a Unix file system. The data access structure 275 can be maintained, for example, by the data access server 21 in memory or on a local disk (not shown in this figure) or even on a portion of the shared storage device 211 that is natively accessible to the computing system 201-1. Once the data access server 210 "exports" a file system 275 within the data access structure 275 containing the data 220, the systems administrator 230 for computing systems 201-1 through 201-N (FIGS. 5 and 6) can, for example, use an NFS "mount" command 216-1 to allow the computing systems 201-1 through 201-N to mount the exported file system in the data access structure 275 containing the data 220.

Once such a file system 275 has been mounted on the computing systems 201-1 through 201-N in this manner, the applications 206 can access the data 220 by providing operating system calls such as fopen( ), read( ), and write( ) via application messages 216-2 to the NFS data access client 208. In response to such application messages 216-2, the data access client 208 communicates with the distributed data interface 250-1 using the NFS protocol (i.e., via client messages 217). The data access translator 260, as discussed above, provides the go-between for the NFS commands (client messages 217) and the data access routines 270. The data access routines 270 in turn obtain data storage information 218 from the computing system 202 (FIGS. 5 and 6) via data access requests 219-2 to the data access agent 212, if the data storage information 218 is not already present in the file system 275, which initially it is not. The data storage information 218 in this example is initially contained within catalog or directory information 280, such as is maintained by mainframe operating systems 205 such as MVS.

The data access translator 260 uses the data storage information 218 to incrementally build and maintain the virtual file system 275. The data access routines 270 can use the data storage information 218 maintained within the virtual file system 275 to obtain access to the data 220 via data access requests 219-1. The data storage information 218 provides, for example, the necessary disk location(s) of the data 220 which may include an MVS data set name, size, location, partitions, offsets for reading and/or writing, and so forth.

Figure 9:
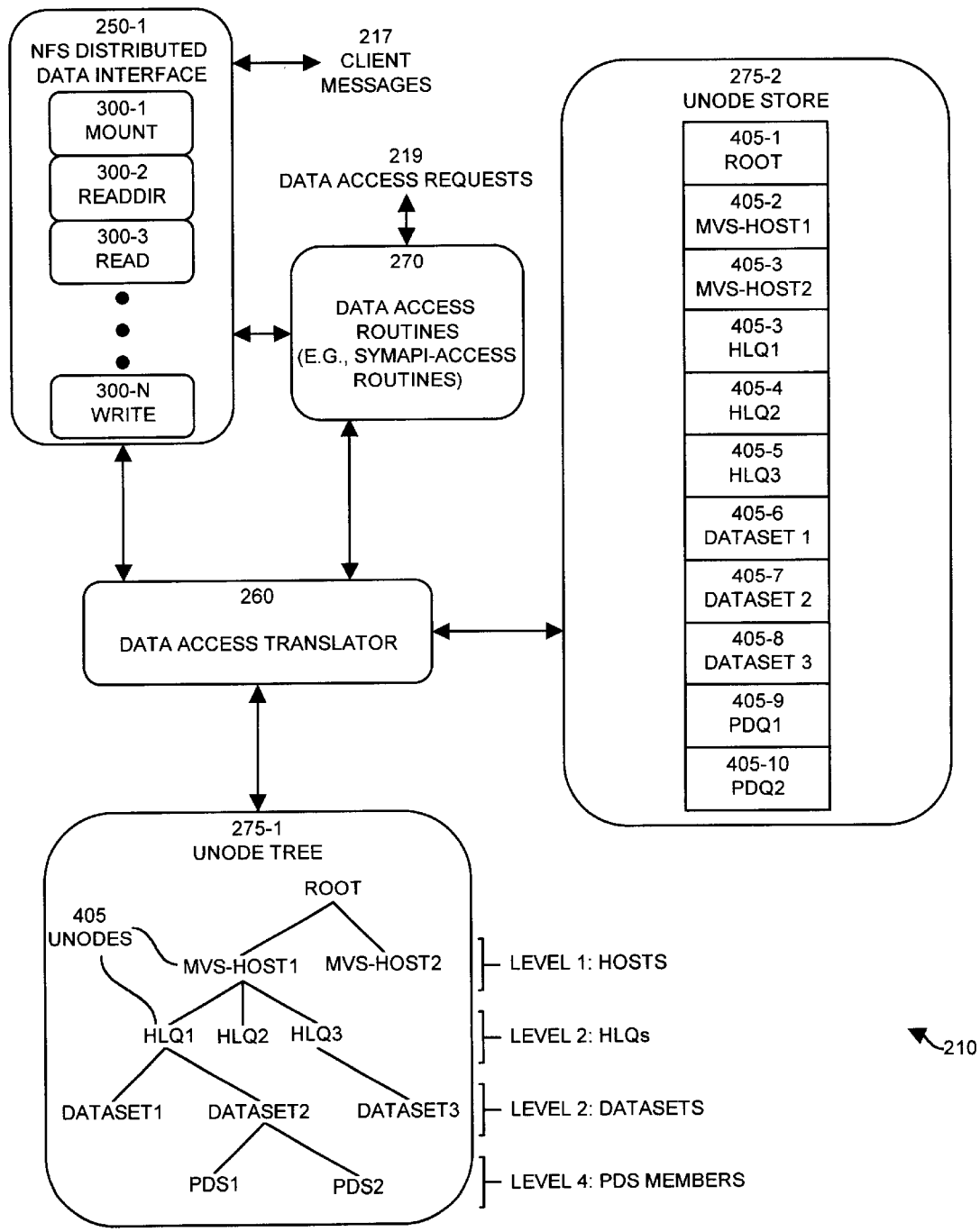
FIG. 9 illustrates an example design of the data access server that includes a virtual file system configured according to an embodiment of the invention.

FIG. 9 illustrates a more detailed software design of the data access server 210 configured according to one embodiment of the invention. The design includes the distributed data interface 250-1 containing various interface modules 300, the data access translator 260, the data access routines 270, a the virtual file system 275 which is, in this example embodiment, provided by the unode tree 275-1 and unode store 275-2.

The distributed data interface 250-1 illustrated in this embodiment supports the NFS protocol. As shown, each NFS protocol command that can be exchanged between a data access client 208 and the data access server 210 is handled by a respective interface module 300-1 through 300-N. In other words, a single interface module 300 supports the proper remote procedure call interface (i.e., provides and receives parameters to and from client messages 217) for an NFS command that is compatible with the version(s) of NFS in use by the specific implementation, such as NFS versions 2 or 3, or WebNFS. As shown in this example, interface module 300-1 supports the NFS "MOUNT" command, interface module 300-2 supports the NFS "READDIR" command, interface module 300-3 supports the NFS "READ" command, interface module 300-N supports the NFS "WRITE" command to write data to a file in the file system, and so forth. Other NFS commands that are supported by the system of the invention but not shown due to drawing space limitations are NFS commands such as RMDIR, MKDIR, GETATTR, SETATTR, SYMLINK, MKNOD, ACCESS, READLINK, CREATE, LINK, REMOVE, RENAME, READDIRPLUS, FSSTAT, FSINFO, PATHCONF and COMMIT. These are only examples, greater or fewer commands may be, supported in different embodiments. If a version of NFS is supported such as WebNFS, other NFS protocol commands can be supported as well via interface modules 300 that are not specifically shown for such commands as GET_PUBLIC_FILE_HANDLE.

The portions of the interface modules 300 that actually receive and generate client messages 217 (i.e., the procedure call interfaces) may be created, for example, by programming development tools such as a Remote Procedure Call Generator (RPCGEN, not shown) tool to comply with standard published data communications protocol specifications such as NFS. RPCGEN is a software development tool that can be used to read specially formatted interface descriptions (e.g., an interface description defining the various client-server parameters used for each protocol routine command interface) and to produce remote procedure call "stub" routines that provide all required client request parameters to support the protocol for a particular programming language or computing system development platform. RPC-GEN in this example thus can be used to help produce the front-end interfaces that can properly accept each client request parameter used for each different NFS command (one stub for each interface module 300-1 through 300-N) that can be sent to and from the data access clients 206 that comply with the standard protocol. Each interface module 300 thus defines the client request parameters that will receive data in response to received client message 217 formatted as one of the protocol commands.

It is very important to understand at this point in this description that NFS is used merely as an example data sharing protocol and that the embodiments shown support the NFS protocol by way of example only. As indicated above, many other data sharing protocols exist and can be supported by, the system of the invention. Even other network file sharing protocols, such as CIFS, which is generally the Windows equivalent of NFS, can be supported by this invention. As such, the design of the data access server 210 of this invention is meant to be general in nature and the protocol interface modules 300, while supporting NFS in the examples in FIGS. 8 and 9, can be adapted or created by those skilled in the art to support one or more of the many different types of data exchange protocols while still being within the design and scope of this invention. The use of RPCGEN is merely provided as an example of how to help produce a set of interface modules that can be properly invoked by protocol commands from a data access client 208. Other techniques for generating such procedure stub calls, routines or interfaces are applicable as well, including writing each interface by hand using software coding techniques.

Returning now to the description of the embodiment in FIG. 9, within the data access server 210, one or more of the interface modules 300 get activated when the data access server 210 receives one or more client messages 217 from a data access client 208. Assuming that the client message 217 complies with the requirements of the protocol, the corresponding interface module 300 receives one or more client request parameters 262 defined by the protocol command that contain various data values. For instance, if a client message 217 is a properly formatted NFS READ command such as the example client message 217 shown in FIG. 7B, each client request parameter 262 will contain proper data or values required to carry out a READ command by a typical NFS server.

Since the data 220 being access in a preferred embodiment is not natively compatible with data storage formats or data types typically used on the computing system 201 that performs (e.g., executes) the data access server 210, the data access routines 270 provide, in a preferred embodiment, a number of routines that "understand" the data formats imposed on the data 220 in the shared storage device 211. In other words, while typical programs such as applications 206 on the computing platforms 201 cannot natively access the data 220, the data access routines 270 can properly access the data 220. To do so, however, requires that the data access routines 270 first obtain data storage information 2i8 from the computing system 202 (e.g., the mainframe in a preferred embodiment). As briefly discussed above, the data storage information 218 can provide information concerning, for example, a specific volume, disk, location, controller or other data access information needed to get at the data 220 in the shared storage device 211. The data storage information 218 can also indicate, for example, the name of an MVS data set containing the data, offsets into the particular data set at which point the data is located (or is to be written in the case of a write), locking information concerning other programs that may be accessing the data 220, and so forth.

The data access routines 270 are invoked in response to the activation of the various interface modules 300. Generally, each interface module 300 may be encoded (i.e., may be written) with a selection of (i.e., to use or perform) one or more data access routines. The selection of the routines is based on an action specified by the function or command (e.g., NFS READ, NFS WRITE, NFS READDIR, etc.) to which the interface module 300 corresponds (as determined by the client message 217 which invokes the interface modules 300). As such, a client request message 217 (e.g., specifying a particular NFS command) causes the distributed data interface 250-1 to select which data access routine(s) 270 to perform.

With the assistance of the data access translator 260 (as will be explained in more detail), the client request parameters 262 in the client message 217 are translated into data access parameters required for the selected data access routines 270. Once this translation takes place, the data access server 210 can perform the selected data access routines 270 to allow the data access server 210 to communicate with the data access agent 212 in the computing system 202 to request the data storage information 218. The data access agent 212 receives such data access requests 219-1 (FIG. 6) and provides the data storage information 218 as a response back to the data access routine 300. The data storage information 218 is then parsed by the data access translator 260 to determine the specific contents of the data storage information 218. Once the data storage information 218 is determined, other data access routines 270 can be performed (i.e., can be invoked from the interface module 300 that initially called the data access routines to get the data storage information 218) to then provide the proper access to the data 220, based on the data storage information 218.

The data access routines 270 in an embodiment of the invention that allows the data access server 210 to access MVS data from a mainframe 202 are SymmAPI-Access routines produced as noted above, in a software product by EMC Corporation of Hopkinton, Mass.

Generally as highlighted above, SymmAPI-Access is a set or library of Application Programming Interface (API) function calls that provide access to MVS data sets from open systems computing platforms, such as Unix and Windows NT platforms. Programs created with SymmAPI-Access run on non-MVS platforms. Full details on the use, implementation and configuration of software applications for the use of SymmAPI-Access are provided in the publication "SymmAPI-Access Programmers Reference Manual", EMC Part Number 200-999-616-02, produced by EMC Corporation. The entire teachings and contents of this manual are hereby incorporated by reference.

The aforementioned SymmAPI-Access manual includes full information on the details of creating applications that can incorporate function calls to the various API function provided in SymmAPI-Access to access MVS data in MVS data sets. The InstaShare Agent discussed in this manual corresponds to the data access agent 212 in a preferred embodiment of the invention. Likewise, the MVS metadata and catalog information returned form the InstaShare Agent corresponds to the data storage information 218 in preferred embodiments of the invention. Generally, as noted above, using SymmAPI-Access functions as the data access routines 270 of the invention, embodiments of the invention can read and/or write MVS data set data. SymmAPI-Access handles authentication of users, file locking issues, mainframe security issues, and other such factors involved in obtaining access to the data 220.

Embodiments of the data access server 210 that support file sharing protocols such as CIFS and NFS provide the virtual file system 275. The virtual file system 275 in such embodiments is maintained by the data access translator 260 and includes a unode tree 275-1 and a unode store 275-2. Generally, the purpose of the virtual file system 275 is to impose a logical structure for various different portions of data 220 as they are accessed by applications 206. The virtual file system 275 of the invention, for example, can provide an abstraction of a Unix or Windows file system (e.g., an NT file system). The data access routines 270 (e.g., SymmAPI-Access functions) can use the data storage information 218 obtained in response to client messages 217 requesting access to the data 220 to populate unodes 405 within the virtual file system 275. Thus, for each portion of data 220 that is accessed, or for which access is requested (via one or more data access clients 208), the data access server 210 uses the data storage information 218 not only to access the data 220 in the shared storage 211, but also to create and maintain the virtual file system 275.

The virtual file system 275 is based around unodes 405 which are maintained in the unode tree 275-1 in a hierarchical manner (e.g., in an N-ary tree data structure) as illustrated. Each unode 405 can represent a file or a directory in the virtual file system 275. The example embodiment of the data access server 210 in FIG. 9 creates the unode tree 275-1 based on catalog and data space information concerning data sets maintained by the mainframe computing system 202. More specifically, when the data access routines 270 are used to obtain data storage information 218 via data access requests 219-1 (FIG. 6), the data access translator 260 translates mainframe directory or catalog data 280 (FIG. 8) which is included in the data storage information 218 (FIG. 8) into, in this example, a four-level directory hierarchy of unodes 405. This hierarchy is shown in the unode tree 275-1 in FIG. 9.

As shown in FIG. .9, the top level of the unode tree 275-1 is a ROOT unode 405 that serves as the root (e.g., "/" in a Unix file system) or top of the hierarchy. The first level (LEVEL 1) of the unode tree 275-1 below the root level contains a unode 405 for each computing system 202 (e.g., each mainframe host in this example) that shares data in a shared storage device 211 (there may be more than one coupled to computing system 201-1 and the shared data storage device 211) that the data access server 210 is configured to access. Two hosts are represented as unodes 405 in this example, MVS-HOST1 and MVS-HOST2. MVS-HOST1, may correspond, for example, to the mainframe computing system 202. The second level (LEVEL 2) of unodes 405 in the hierarchy of the unode tree 275-1 corresponds to each MVS High Level Qualifier (HLQ) accessible under a given data access agent 212 within that mainframe host computing system (e.g., 202) of the parent unode 405. For instance, MVS-HOST1 (a level 1 unode 405) may have three HLQs (HLQ1, HLQ2, HLQ3) which each get assigned a unode 405 in the unode tree 275-1 as shown in the example illustration. The third level (LEVEL 3) in the unode tree 275-1 is for unodes 405 used to represent individual MVS mainframe data sets under a given HLQ (e.g., DATA SET1, DATA SET2, DATA SET3 under HLQ1), as illustrated. Unode entries 405 in the third level (LEVEL 3) are either considered files (with respect to the virtual file system 275) that represent flat MVS data sets, or level three unodes 405 may be considered directories representing MVS PDS members within MVS data sets. Finally, the fourth level of hierarchy (LEVEL 4) in the unode tree 275-1 provided in this example embodiment is used for unodes 405 for each PDS member. MVS catalog entries can be handled by the data access translator 260 by collapsing their entries into a master catalog which can be represented in the unode tree 275-1 as indicated above.

In this particular embodiment, since each unode 405 in the unode tree 275-1 represents one of the aforementioned various mainframe or MVS components, the data access server of the invention imposes a file system hierarchy (i.e., the unode tree 275-1) that can be presented via the data access translator 260 to the distributed data interfaces 250. As such, the data access translator 260 can accept NFS file system commands from data access clients 217 such as READDIR to traverse directories in a Unix-like file system and can use the unode tree 275-1 as a file system for such purposes. This enables the data access server 210 to provide such features as MVS catalog and data set browsing by client applications 206.

In this embodiment, the unode store 275-2 maintains the set of unodes in the unode tree 275-1 as a unode hash table, array, linked list, queue, or other such data structure. Unodes 405 can be initially created by the data access translator 260 upon receipt of new data storage information 218 that indicates newly "seen" MVS hosts, data sets, HLQs, PDS members or other catalog data corresponding to the various unode level as described above with respect to the structure of the unode tree 275-1. That is, with each client message 217 that prompts a data access request 219-1 to obtain more data storage information 218, the data access translator 260 can continue to build up the virtual file system unode tree 275-1 by parsing the data storage information 218 to detect new data sets, PDS members, or other such information. Each time new information is discovered about how the mainframe computing system 202 stores data, the data access server 210 can update the virtual file system unodes 405, create unodes, remove obsolete unodes, and so forth. This keeps the unode tree 275-1 (and store 275-2) in sync with the mainframe catalog information 280.

In some embodiments, each client message 217 can cause the data access server 210 to perform an expand function (explained later) to make sure the unode tree 275-1 is current with the state of the mainframe catalog 280 (FIG. 8). Thus client messages 217 will not attempt to be serviced by the data access server 210 if the requested data 220 were, for example, removed from the catalog. By forcing the expand operation to update the unode tree 275-1 with mainframe catalog information 280, the data access server 210 can also ensure that requests are properly handled.

Figure 10:
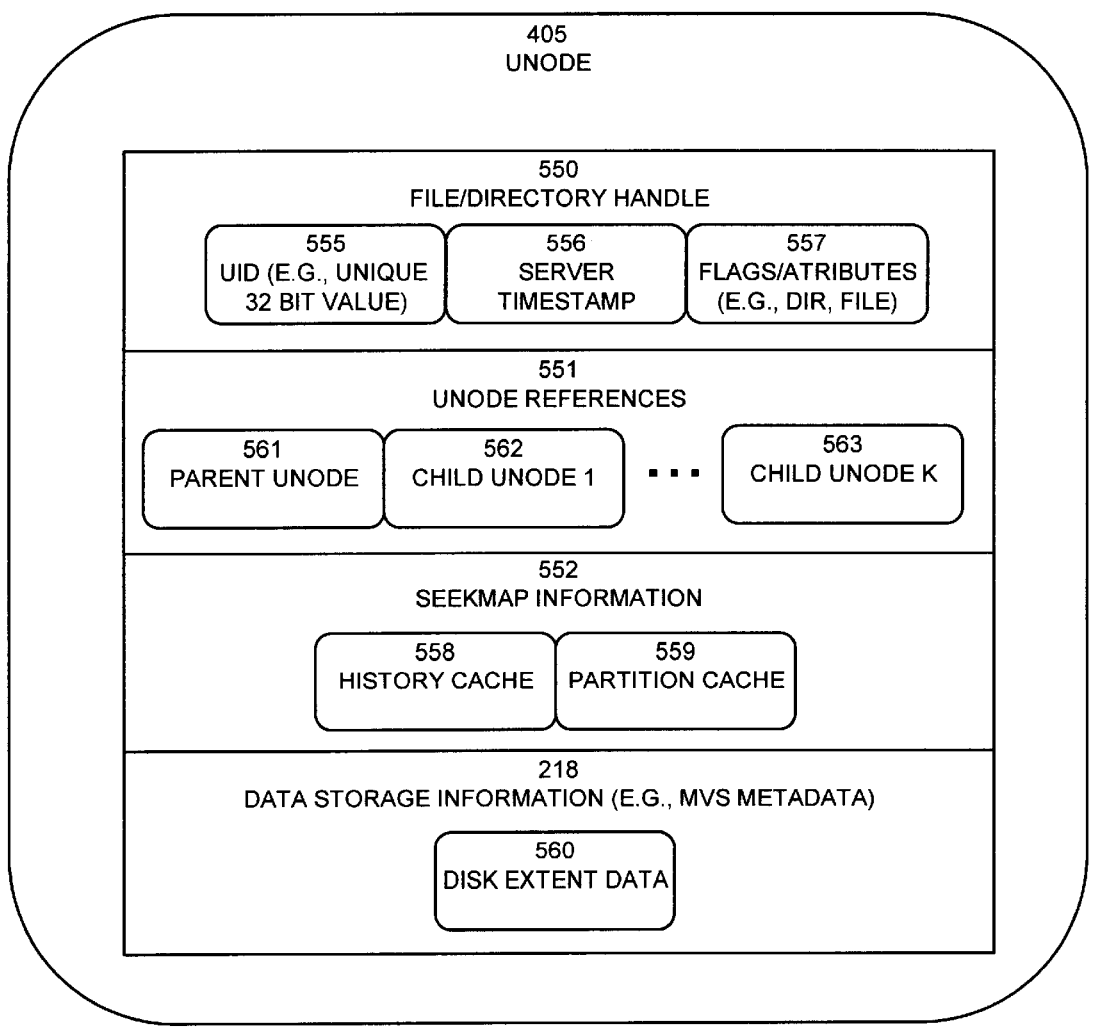
FIG. 10 illustrates an example of the contents of a unode as maintained by the data access server within the virtual file system of the invention.

FIG. 10 illustrates, as an example, the contents and information associated with an example unode 405, as maintained by the data access server 210 of the invention. It is to be understood that the unode 405 is illustrative in nature only and a unode may contain more or less information than that shown. Also, variations in embodiments of the invention may maintain such contents or information shown within the example unode 405 elsewhere in other data structures that are not directly within the actual unode data structure 405. The example unode 405 includes a file/directory handle 550, unode references 551, seekmap information 552 and data storage information 218 which is MVS metadata (i.e., MVS catalog data and/or other information).

The file/directory handle 550 of a unode 405 is generally equivalent in purpose to a typical file handle used to reference a file and/or a directory via an operating system. The handle uniquely identifies the unode 405 via the UID field 555, which can be, for example, a unique thirty-two bit number assigned upon creation of the unode 405. The data access server 210 can return file handle information 550 to a data access client 208 in response to client messages 217 containing requests (i.e., NFS commands) for access to data 220. Once file handle information 550 is obtained by a data access client 208, the client 208 can present this handle 550 to the server 210 in future requests (e.g., via client messages 217), to allow the server 210 to execute data access operations on the data and/or directory referenced or specified by the handle 550.

Since NFS and other file sharing protocols are often stateless, the unode handle 550 includes the server timestamp field 556 which contains the start time of the data access server 210. This timestamp 556 can be used, for example, when the data access server 210 receives a handle 550 in a future data access request to help ensure that the data access server 210 is not acting on a handle which it did not create. By comparing the server timestamp field 556 which a corresponding cached value of a date/time stamp maintained by the server 210, the data access server 210 can be sure the file handle "is one of its own." Other embodiments of the invention can avoid use of such a handle check (using time stamps in this example) which thus allow handles created by one server to be used by other servers.

The flags/attributes field 557 of the file handle 550 can indicate, for example, if the unode 405 is associated with a directory or a file containing data. Both directories and files (i.e., all components of the unode tree 275-1) have a corresponding unode.

The unode references 551 are used to actually maintain the unode tree structure 275-1. The parent unode field 561 can thus contain a pointer or other reference to a parent unode, while child unode fields 562 through 563 (CHILD UNODE 1 through CHILD UNODE K) can be used to maintain pointers to child unodes which can be files or subdirectories below the current unode 405 in the unode tree 275-1.

Because MVS data sets or other types of data maintained by computing system 202 (i.e., by a mainframe) may be, for example, record-oriented and not byte-oriented as in Unix or Windows NT, MVS does not typically support reading from arbitrary byte offsets. In other words, the data storage formats of shared data 220 are not typically compatible with a data storage format typically used by computing systems 201. Accordingly, in order for the data access server 210 to support Unix-style I/O in response to various NFS-commands such as READ, the data access routines 270 (e.g., SymmAPI-Access) can provide a byte-oriented seek function. In some cases, this function may be inefficient since it works by reading from the beginning of the data set until the desired offset is reached. In the data access server 210 of this invention, however, in order to mitigate the cost of random I/O patterns having to access data sets in this manner, the data access translator 260 maintains seekmap information 552. Generally, seekmap information 552 is maintained for any open file (i.e., an MVS file or a data set that has been formerly opened by an NFS command and/or that may be in use by an application 206). The seekmap information 552 is generally used to store or cache mappings between Unix byte offsets and MVS file positions in the shared storage device 211. In this example embodiment, two types of caches are kept: the history cache 558 which keeps track of the location of the last N NFS READ requests, and the partition cache 559 which keeps mappings for fixed equidistant positions within an open file or other portion of data 220 associated with this unode 405.

In use, data access functions 270 that attempt to read or write data 220 to the shared storage device 211 (e.g., SymmAPI-Access functions such as read( ) and write( )) on behalf of data access clients 208 can consult the seekmap information 552 in the unode 405 for that file to position a file pointer (not shown) as close to the desired offset in the data file 220 on the shared storage device 211 as possible before calling a byte oriented seek function (e.g., SymmAPI-Access is_seek( )) to seek (for example, by reading) the rest of the way to the desired location.

The data storage information. 218 that the data access server 210 retrieves from the computing system 202 can also be associated with unode for which data access is being attempted. In this example, the data storage information 218 includes disk extent data 560 that indicates precise disk and/or volume location information, file sizes, offsets, and the like for the data 220 associated with the unode 405. Disk extent data 560 may not be required for unodes 405 that represents higher levels in the unode tree 275-1, such as, for example, LEVEL 1 hosts or LEVEL 2 HLQs. It is to be understood that unode information such as seekmap information 552 may be maintained within the data access translator 260 for each open file and need not be part of each unode 405. As such, the unode structure 405 is merely illustrative of content associated with a unode 405, but does not limit or restrict the invention to such content.

As has been stated above, the data access translator 260 provides mechanisms to obtain and manipulate information related to the virtual file system 275, as well as client messages 217 and data access requests 219. To do so, the data access translator 260 provides a variety of functions that can be used in various combinations or alone to support the general operations of the invention as explained. The following list of functions that are implemented in a preferred embodiment of the invention in order to handle the data access translation operations noted above. The function names are given in C++ calling format and a brief explanation of their processing is provided. It is to be absolutely understood that these functions are not meant to be limiting of the invention. Rather, those skilled in the art will at this point understand that the operational details of the invention have been described in sufficient detail to support many different embodiments and that the following functions can be implemented in a variety of ways without undue experimentation. As such, the functions presented below represent implementation specific aspects of the data access translator 260 according to one example embodiment only.

afi_uid_t afi_Unode::getUid( );
This function can traverse the unode store 275-2 or the unode tree 275-1 and return the UID 555 of the unode.

afi_status_t afi_Dir::expand( );
This function can bring a list of descendent unodes 405 (i.e., lower level unodes in the unode tree 275-1) up to date with corresponding counterparts in the MVS catalog information 280 maintained on the mainframe computing system 202. This is useful to periodically update the virtual file system 275 with the current state of data set existence within the shared storage 211, for example.

afi_Unode*afi_Dir::lookupByName(char*name);
This function can search a directory unode's 405 immediate descendents (i.e., via traversing the unode tree 275-1) for a particular file or directory specified by the given name. The name may be specified, for instance, in the attributed field 557 of the unode handle 550. If the search is not unsuccessful, a data access routine 270 can be called to determine if the file or directory has been created or deleted on the mainframe computing system 202 since the last call to expand( ).

afi_Unode*afi_UnodeStore::lookup(afi_uid_t uid);
This function can search the unode Store 275-2 for a unode 405 with the given UID 555.

afi_status_t afi_File::open( )
This function can open a file specified by a unode 405 by calling a data access function such as SymmAPI-Access is_fopen( ) and then places a resulting file pointer (e.g., IS_FILE, which is a SymmAPI-Access file descriptor) in the unode 405. In addition, the function can create a seekmap information 552 for the unode 405.

afi_status afi_File::seek(afi_offset_t offset);
This function can be used to seek to the desired byte offset in the specified file. To do so, the function first consults the seekmap information 552 to get as close to the desired offset as possible. Next, the function can call a data access routine 270 such as SymmAPI-Access routine is_seek( ) to seek the remaining distance in the file.

afi__status__t afi__File::read(char*buffer, long offset, long count);

This function can be used to read count a certain number of bytes starting at an offset in a file. To do so, the function first opens the file if necessary (using a data access routine 270 such as SymmAPI-Access is__fopen( )) and then calls the seek function afi__File::seek( ) to seek to the desired offset in the file. Next, another data access routine 270 can be used such as SymmAPI-Access is__fread( ) to read the desired number of bytes from the file.

afi__status__t afi__File::write(char*buffer, long offset, long count);

This function can write count a number of bytes from the buffer starting at the offset. To do, the function first opens the file if necessary and calls afi__File::seek( ) to seek to the desired offset. Next, the function calls a write data access routine 270 such as SymmAPI-Access is__fwrite( ) to write the desired bytes.

Now that a detailed description of the components and operation of the invention has been provided, a few brief operational examples of the invention will now be presented with respect to handling NFS protocol commands. The following example NFS operations are provided along with an overview of how the system of the invention as explained above can be used to fully support such commands on behalf of data access clients 208 and the applications 206. Understand that the system of the invention can be used to support the entire NFS protocol and that the example below are not meant to be limiting. The examples provided below however are some of the most common NFS operations used between NFS clients and NFS servers.

Example NFS Operations

MOUNT

The mount interface module 300-1 is presented with a pathname (e.g., /MVS-HOST1/HLQ1) for the requested directory. The data access server 210 generally executes the following steps.

1. Checks to see if the given directory path (e.g., /MVS-HOST1/HLQ1) is legal according to the configuration specified by the system.
2. Search the Unode Tree 275-1 for the Unode 405 representing the given directory. This can be done iteratively, by first starting at the root Unode 405-1, and calling afi__Unode::lookupByName( ) and passing the function the first component (e.g., /MVS-HOST1) of the path (e.g., /MVS-HOST1/HLQ1). Next, lookupByName( ) can be called on the resulting Unode (e.g. 405-2), passing it the second component of the path (e.g., HLQ1), and so on.
3. This is continued until either lookupByName( ) fails or the path name has no more components. In the case of the former, an error is returned; otherwise a directory handle 550 is created in the resulting Unode and it is returned to the client.

LOOKUP

Lookup (corresponding to an interface module 300, not shown in FIG. 9) is presented with a directory handle 550 and name which it passes to afi__Dir::lookupByName( ). If the search is successful, the resulting Unode 405 contains a file/directory handle which is returned.

READDIR/READDIR+

1. The Readdir interface (300-2) module is presented with a directory handle 550 which is converted to a Unode 405. It is also given a cookie (not shown) which is generated by the data access server 210 to serve as a bookmark that is used when multiple READDIR calls are necessary to read the contents of a single directory (i.e., may be large, requiring multiple readdirs).
2. If the cookie is 0 then the request should begin at the start of the directory. First, afi__Dir::expand( ) is called on the Unode 405 to synchronize the unode's list of descendents with the computing system 202 (e.g., mainframe). Next, a start pointer is set to the first descendent of the directory.
3. If the cookie is non-zero then it is used to make a call to afi__UnodeStore::lookup( ), and the start pointer is set to the Unode which follows the resulting Unode in the list. If the lookup fails then an error is returned to the client.
4. The list of descendents from steps 2/3 is then traversed starting from the start pointer. For each member unode of the list, the relevant information (name for READDIR; name, handle, and attributes for READDIR+) are packed into a reply client message 217. This continues until either the list or the reply buffer are exhausted.

READ

The Read interface module 300-3 is presented with a file handle 550, an offset, a length, and a buffer of size length. The buffer is allocated and de-allocated by the RPC stubs for the interface module. The READ interface module 300-3 converts the file handle 550, via data access translator 260, to a Unode 405 and then calls afi__File::read( ), passing in the offset, length and buffer address in order to read the data 220 requested.

WRITE

The Write interface module 300-N is presented with client message 217 including a file handle 550, an offset, a length and a buffer of size length. The buffer is allocated and de-allocated by the RPC stubs. WRITE 300N converts the file handle to a Unode 405 with the assistance of the data access translator 460 and then calls afi__File::write( ) passing in the offset, length and buffer address.

As is apparent from the above described operations of various NFS commands supported by the invention, the data access server 210 allows client applications 206 to access MVS data or other types of data that may be natively incompatible with computing system platforms 201 due to file system and data storage format incompatibilities. As such, the invention provides a graceful yet powerful design and architecture that can be used to share data between computing systems that otherwise are not able to do so.

Returning attention now to FIG. 5 and/or 6, certain implementations of various operating systems 205 that control the computing system 202 (e.g., MVS on a mainframe that maintains the data 220 in the shared storage 211) may require user authentication in the form of a login process or procedure that is performed before access to the data 220 is granted, whether that access be local or via the shared connection 214 in the case of shared storage 211. As such, since the data access server 210 of the invention uses data access routines 270 to access such data, it operates with the data access agent 212 over the network 213 on behalf of a user (i.e., a user of an application 206 via the data access client 208). Accordingly, embodiments of the invention that require such authentication can provide a command, program, routine or other such executable or interpretable entity that is performed on the computing systems 201-1 through 201-N to allow a user (not shown) to provide user login (e.g., username/password) information to the data access server 210. The data access server 210 in turn can use specific data access routines 270, such as a SymmAPI-Access function, to authenticate data access requests provided by users to the computing system 202.

Using the mechanisms and techniques described above, the invention provides software applications (e.g., 206) with data access to shared data 220 via the data access server 210 using, for instance, standard widely accepted data or file sharing protocols such as NFS and CIFS. The computing systems 201 upon which the software applications 206 execute need not have a direct connection to the shared storage device 211. Further still, the applications 206 need not be performed (e.g., need not execute) on the same computing system 201-1 as the data access server 210, though they may as does application 206-1 in this example. Incompatibilities between data storage formats of the data 220 provided within the shared storage device 211 by the mainframe 202 are hidden by the invention from the applications 206, which each may require a different data format. This is due in part to the fact that the data access server 210 of the invention provides standard distributed data sharing protocol front-end interface modules 250 to interface with the clients 208-1 through 208-N, while using, in the aforementioned example embodiments, a mainframe data access technique to communicate with the mainframe 202 and to obtain access to the mainframe data 220 in the shared storage device 211. The data access server 210 thus insulates the applications 206 from the difference in data storage formats that can occur, for example, between MVS data set formats (e.g., used to store data 220) and open systems file formats such as those provided by a standard Unix or other hierarchical style file systems.

Figure 11:
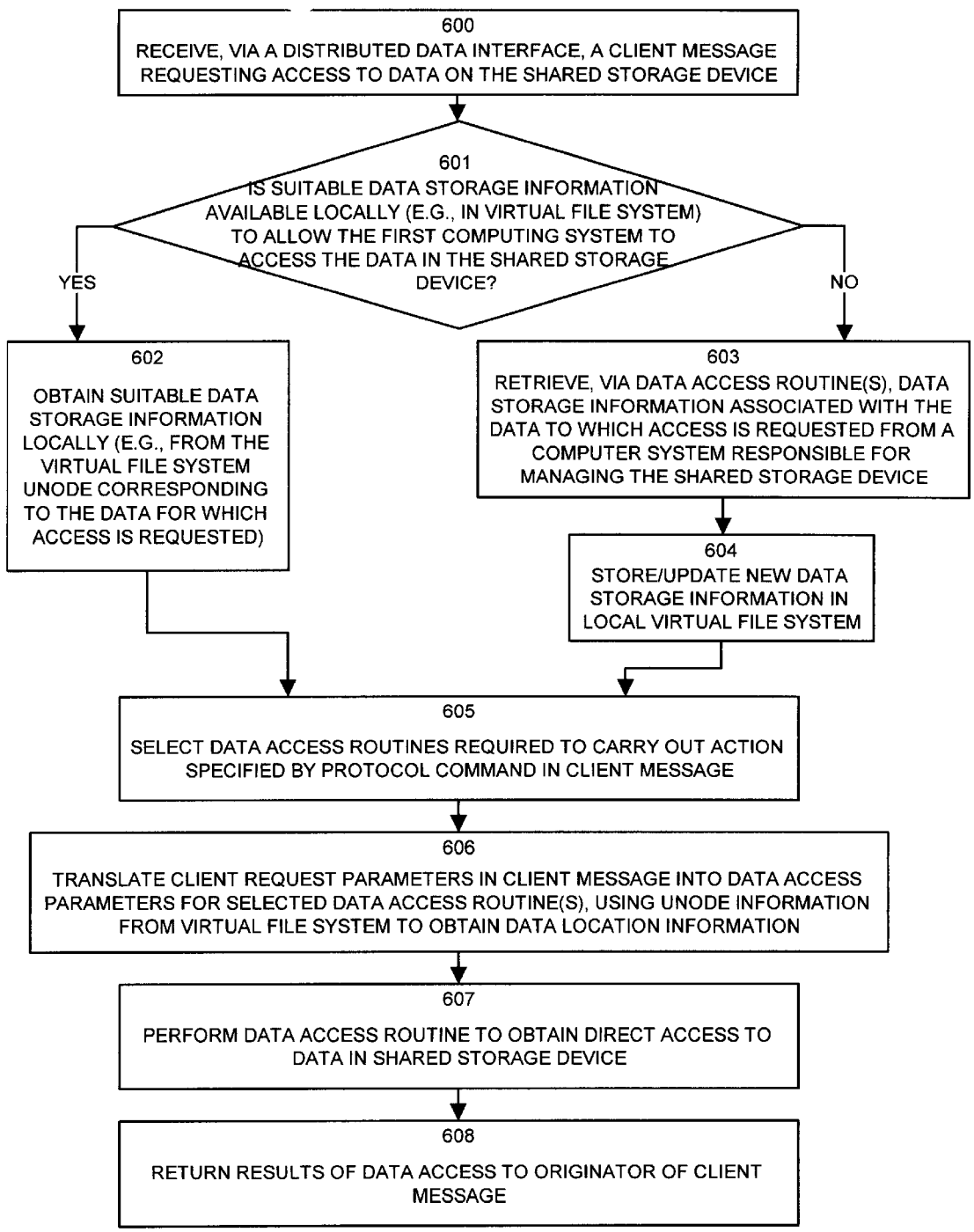
FIG. 11 is a flow chart of the processing steps generally performed by the data access server according to the operation of embodiments of the invention to obtain access to shared data on behalf of clients.

FIG. 11 provides a flow chart of general processing steps 600 through 608 that can be performed by embodiments of the invention. The operations shown in FIG. 11 are generally perform via a software implementation of the data access server 210 that executes on a processor unit within the computing system 201-1. The software data access server 210 causes the processor to perform these steps, though the description explains the operations with respect to the data access server 210 performing them.

In step 600, the data access server 210 receives, via the distributed data interface 230, a client message 217 requesting access to some data 220 on the shared storage device 211. (note that is the access requested is a write, the data may not yet exist) In step 601, the data access server 210 determines if suitable data storage information 218 is available locally, such as in the virtual file system 275, in order to compatibly allow the data access server 210 on the first computing system 201-1 to access the data 220 in the shared storage device. This determination essentially determines if the data access server 210 must request data storage information 218 from the computing system 202 (e.g., the mainframe), or determines if the data access server 210 has already accessed the requested data, for instance, in response to a former client message 217, in which case the data storage information 218 may already exist locally. If suitable data storage information 218 is available locally in the virtual file system 275, the data access server performs step 602 to obtain the suitable data storage information 218 from the virtual file system 275, using, for instance, unode 405 information such as the data storage information 218 including disk extent data 560 or the seekmap information 552. If the data access server 210 determines in step 601 that the required data storage information 218 is not available, the data access server 210 performs steps 603 and 604.

In step 603, the data access server 210 retrieves, via one or more data access routines (as explained above), the data storage information 218 associated with the data to which access is requested, from the computer system 202 that is responsible for maintaining the data 220 in the shared storage device. Next, in step 604, the data access server 210 stores or updates the local virtual file system 275 with any new data storage information 218 just obtained. This may require new unodes to be created, or unodes that exist may need to have information updated.

Once the data access server 210 has obtained the data storage information 218 in order to carry out the data access as requested in the client request message 217, step 605 is performed in which the data access server 210 selects data access routines 270 required to carry out the action or command specified by the client message(s) 217. Next, in step 606, the data access server 210 translates the client request parameters 262 in the client message(s) 217 into data access parameters for the selected data access routines 270. Thereafter, in step 607, the data access server performs the data access routines to obtain direct access to the data 220 in the shared storage device 211. Finally, in step 608, the data access server 210 returns the results of the data access to the originator of the client message, which is a data access client 208 that originally supplied the message. Using the techniques described above, the data access server 210 of the invention provides access to shared data on behalf of applications 206 that use client 208 on computing systems 201.

While this invention has been particularly shown and described with references to preferred embodiments thereof, it will be understood by those skilled in the art that various changes in form and details may be made therein without departing from the spirit and scope of the invention as defined by the appended claims. As an example, while the above described example computing systems 201 are indicated to be Unix or Windows based systems, systems such as the Apple Macintosh or other computing platforms can support a data access server configured according to the invention. Likewise, mainframe operating systems such as MVS, OS/390 and OSI/MSP can be used on the computing system 202. Other variations are contemplated as being within the scope of the invention as well. For instance, structurally, there can be many shared storage devices 211 coupled to the computing system 201-1 and the data access server 210 may serve data from each shared storage device. Alternatively, there may be a data access server 210 that each concurrently perform in the computing system 201-1 for each shared storage device 211. In another alternative, the data access server 210 may support many different protocols in which case there would be a set of interface modules 250 for each supported protocol. For instance, a single data access server 210 can support both CIFS and NFS on the same data. In such a configuration, each protocol would have a set of interface modules to which protocol commands for that protocol (received in client messages 217) would be directed.

Other alternative embodiments of the invention support different levels of access to the data 220, such as read-only access or write only access. In such embodiments, the full protocols between the data access clients 208 and the data access server 210 are supported in that client messages 217 requesting any non-supported access will not make the data access server 210 fail. Rather, access commands that are not supported but that are presented to the access data access server 210 can simply be denied with a client message 217 being returned to the client 208 indicating that the requested access is not supported. A read-only embodiment, for example, might only support protocol commands (e.g., NFS or CIFS commands) to only read data, files, and/or directory structures but not modify or write such structures.

In other embodiments, the system of the invention can provide the data access server within the operating system kernel, such that the data access server does not specifically perform as a separate user space process. In such embodiments, the data access server may be a kernel process for example, combined as part of the operating system. This embodiment differs from some of the embodiments described above in that in those embodiments, the data access server operates primarily as a user space process. In either case, it is to be understood that the system of the invention provides that the data access server can operate either as a user space or kernel (e.g., operating system) space process, routine, method, thread, or other performable operation within a computing system.

Preferably, the data access server 210 of the invention is implemented as a software program and can be written in any programming language such as C, C++, Java, Perl, or another such language. Computing systems 201 and 202 each generally include an inter-coupling of at least one processor for performing processes, tasks or the like such as the data access server 210, as well as a memory system and some local disk storage for maintaining some local data. Those skilled in the art will understand that there can be many variations made, for example, to the data access server functions explained above while still achieving the same objective of those functions and the invention in general. Such variations are intended to be covered by the scope of this invention. As such, the foregoing description of embodiments of the invention are not intended to be limiting. Rather, any limitations to the invention are presented in the following claims.

What is claimed is:

1. A method for providing access by a first computing system to data stored in a shared storage device managed by a second computing system, wherein a data storage format provided in the shared storage by the second computing system is incompatible with a data storage format required by the first computing system, the method comprising the steps of:

receiving, at a data access server performed on a first computing system, a client message to access data on the shared storage device;

in response to receiving the client message, retrieving data storage information provided from the second computing system coupled to the first computing system, the data storage information allowing the first computing system to access the data in the shared storage device in a manner that is compatible with the first computing system, retrieving the data storage information further comprising:

first determining if suitable data storage information is available locally on the first computing system to allow the data access server to provide access to the data on the shared storage device in accordance with the client message in a manner that is compatible with the first computing system, and if so:

using the suitable data storage information that is available locally on the first computing system as the retrieved data storage information;

and if not:

retrieving, from the second computing system, the data storage information that is required for accessing the data in the shared storage device in a manner that is compatible with the first computing system; and providing compatible access to the data on the shared storage device, directly from the data access server, based on the retrieved data storage information, the direct, compatible access alleviating processor resources of the second computing system from the compatible access.

2. The method of claim 1 wherein the data access server is a distributed data server and the step of receiving the client message includes the steps of:

providing, from the data access server to at least one data access client requiring access to data in the shared storage device, a distributed data interface that operates according to a distributed data protocol; and accepting the client message from the at least one data access client using the distributed data protocol over the distributed data interface provided by the data access server, the client message including a data access command formatted in accordance with the distributed data protocol, the data access command indicating a type access to be provided to the data in the shared storage device on behalf of the client.

3. The method of claim 2 wherein:

the data access server is a distributed file system data access server and the distributed data interface is a distributed file system interface provided by the data access server and the distributed data protocol is a distributed file system protocol; and wherein the step of accepting the client message includes the step of receiving the client message from the at least one data access client in accordance with the distributed file system protocol.

4. The method of claim 3 wherein the distributed file system protocol is at least one of a network file system protocol, a web based network file system protocol and a CIFS protocol.

5. The method of claim 2 wherein the distributed data protocol is at least one of a CORBA data exchange protocol, a Java beans based messaging protocol, and a hypertext transfer protocol.

6. The method of claim 2 wherein the at least one data access client requiring access to data in the shared storage device is performed on a computing system that is different than the first computing system and wherein the steps of providing and accepting are performed by the data access server using the distributed data access protocol over a network coupling the first computing system with the computing system performing the at least one data access client.

7. The method of claim 1 wherein the step of retrieving data storage information retrieves the data storage information from a virtual file system maintained in the first computing system by the data access server, the virtual file system obtaining the data storage information from the second computing system prior to receipt of the client message in response to processing formerly received client messages.

8. The method of claim 7 wherein the step of retrieving the data storage information from the virtual file system includes the steps of:

searching a number of unodes in the virtual file system to obtain a unode corresponding to the data to which access is requested in the client request message; and obtaining the data storage information from the virtual file system based on the unode.

9. The method of claim 1 wherein the step of providing access to the data on the shared storage device based on the retrieved data storage information includes the step of:

performing, by the data access server, at least one data access routine to access the data in the shared storage device in a manner specified in the client message, the at least one data access routine using the data storage information to properly locate and access the data in a format that is compatible with the first computing system.

10. The method of claim 9 wherein:

the client message requests read access to the data in the shared storage on behalf of an application; and the step of performing the at least one data access routine to access the data in the shared storage device includes the steps of:

reading the data in a manner specified in the client message from the shared storage device at a location specified by the retrieved data storage information; and returning the data read by the step of reading from the data access server to a data access client that originated the client message.

11. The method of claim 1 wherein the first computing system is an open systems computing system and the second computing system is a mainframe computing system and the step of receiving a client message includes the step of:

allowing at least one data access client to access the data access server using a distributed file system protocol to request access via the data access server to mainframe data maintained by the mainframe computing system in the shared storage device;

and wherein the step of providing access to the data on the shared storage device from the data access server includes the steps of:

using the data storage information retrieved from the mainframe computing system to directly and compatibly access, by the data access server, the data stored on the shared storage device as specified by a command in the client message; and serving the data to the at least one data access client from the data access server using the distributed file system protocol.

12. The method of claim 11 wherein:

the at least one data access client is performed on the first computing system and acts on behalf of an application also performed on the first computing system; and wherein the steps of retrieving the client message and providing access to the data are performed between the data access client and the data access server using the distributed file system protocol within the first computing system.

13. The method of claim 11 wherein the at least one data access client is a plurality of data access clients and the step of serving the data includes the step of serving data maintained by the mainframe in the shared storage device from the data access server on the first computing system to the plurality of data access clients using a distributed file system protocol.

14. The method of claim 12 wherein at least one of the plurality of data access clients is performed on a computing system that is different that the first and second computing systems and the steps of retrieving the client message and providing access to the data are performed over a network coupling the first computing system and the computing system that is performing the data access client.

15. The method of claim 1 further including the step of:

maintaining, on the first computing system, a virtual file system containing a plurality of nodes, with at least one node for each portion of data for which access is requested via client messages; and wherein the step of retrieving the data storage information includes the steps of:

determining if the data for which access is requested via the client message has a corresponding node in the virtual file system, and if so:

retrieving the data storage information from the corresponding node in the virtual file system;

and if not:

retrieving the data storage information from the second computing system;

creating at least one node in the virtual file system based on the retrieved data storage information; and putting at least a portion of the data storage information retrieved from the second computing system into the node created for that data in the virtual file system.

16. The method of claim 15 wherein the step of maintaining includes the step of:

maintaining each of the plurality of nodes in the virtual file system on the first computing device in a hierarchical format, with different levels of the hierarchical format representing different elements of a storage system managed by the second computing system.

17. The method of claim 16 wherein the hierarchical format maps a mainframe storage arrangement of the data stored in the shared storage device to an open systems file system arrangement.

18. The method of claim 15 wherein the step of maintaining maintains, for each node in the virtual file system, information concerning the relation of that node to other nodes in the virtual file system and a unique handle for the node.

19. The method of claim 15 wherein the step of maintaining maintains, for each node in the virtual file system, data access information including at least one access position for the data within the shared storage device.

20. The method of claim 1 wherein the step of retrieving data storage information includes the steps of:

determining if appropriate data storage information is available in a virtual file system maintained by the data access server on the first computing system based on client request parameters in the client message, and if not:

selecting at least one first data access routine based on a protocol command specified by the client message;

performing the at least one first data access routine to allow the data access server on first computing system to communicate with the second computing system to request the data storage information from the second computer system;

receiving a response to the at least one data access routine from the second computer system; and parsing the response to the at least one data access routine to determine the data storage information and placing the data storage information into the virtual file system maintained by the data access server on the first computing system;

and if so:

translating client request parameters contained in the client message into data access parameters useable for the selected at least one data access routine, the step of translating using data storage information contained in a virtual file system to provide a location in the shared storage device of data for which access is specified in the client request message.

21. The method of claim 20 wherein the step of translating client request parameters contained in the client message includes the steps of:

obtaining at least one client request parameter from the client message; and mapping the at least one client request parameter to at least one data access routine parameter required for performance of the at least one data access routine, the at least one data access routine parameter specifying data storage information to allow the data access routine to obtain access to a location of data within the shared storage device.

22. The method of claim 21 wherein the step of mapping includes the steps of:

using data access translator functions to query a virtual file system of unodes for a specific unode corresponding to a data access handle provided in the client message;

obtaining from the unode the data storage information.

23. The method of claim 20 wherein the step of performing the at least one data access routine includes the step of communicating between the data access server on the first computing system and a data access agent on the second computing system to obtain the data storage information required to perform the protocol command specified by the client message.

24. The method of claim 23 wherein:

the first computing device is an open system computing system and the second computing device is a mainframe and the data storage information is contained within metadata maintained within the mainframe; and wherein the step of communicating sends a request to the data access agent to return metadata obtained from a mainframe catalog for the shared storage device, the metadata including storage information for the data maintained by the mainframe in the shared storage device.

25. The method of claim 1 wherein the step of providing access to the data on the shared storage device includes the steps of:

mapping the data storage information into at least one data access routine parameter of at least one data access routine;

directly accessing the shared storage device by performing the at least one data access routine to send data access requests to the shared storage device; and retrieving, in response to the data access requests, a storage device response including data for which access is requested in the client message; and providing the data to a data access client that originated the client message.

* * * * *